US012686745B2

(12) United States Patent
Kou et al.

(10) Patent No.: US 12,686,745 B2
(45) Date of Patent: Jul. 21, 2026

(54) AMINE-MODIFIED POLYMER, A CONTROLLED FREE RADICAL POLYMERIZATION FOR PREPARING THE SAME AND IMPLEMENTATIONS THEREOF

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Andreas Gernandt, Ludwigshafen am Rhein (DE); Johannes Hermann Willenbacher, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 660 days.

(21) Appl. No.: 17/918,331

(22) PCT Filed: Apr. 12, 2021

(86) PCT No.: PCT/EP2021/059365

§ 371 (c)(1),
(2) Date: Oct. 12, 2022

(87) PCT Pub. No.: WO2021/209349

PCT Pub. Date: Oct. 21, 2021

(65) Prior Publication Data

US 2023/0192962 A1 Jun. 22, 2023

(30) Foreign Application Priority Data

Apr. 14, 2020 (EP) .................................... 20169261

(51) Int. Cl.

*C08G 81/02* (2006.01)
*C08F 293/00* (2006.01)
*C09D 7/65* (2018.01)

(52) U.S. Cl.

CPC ........ *C08G 81/025* (2013.01); *C08F 293/005* (2013.01); *C09D 7/65* (2018.01); *C08F 2438/02* (2013.01); *C08F 2800/10* (2013.01)

(58) Field of Classification Search

None
See application file for complete search history.

(56) References Cited

U.S. PATENT DOCUMENTS

| | | | | |
|---|---|---|---|---|
| 4,581,429 | A | 4/1986 | Solomon et al. | |
| 7,432,329 | B2 | 10/2008 | Haubennestel et al. | |
| 10,623,685 | B2 | 4/2020 | Richards | |
| 2003/0225186 | A1* | 12/2003 | Holmes | C09D 7/45 523/160 |
| 2005/0215720 | A1 | 9/2005 | Fink et al. | |
| 2009/0088518 | A1 | 4/2009 | Engelbrecht et al. | |
| 2009/0221739 | A1* | 9/2009 | Knischka | C08F 2/38 524/505 |
| 2010/0093895 | A1 | 4/2010 | Sulser et al. | |
| 2011/0224375 | A1 | 9/2011 | Knischka et al. | |
| 2012/0172498 | A1* | 7/2012 | Fontana | C09D 17/003 526/263 |
| 2013/0144011 | A1 | 6/2013 | Dabbous et al. | |
| 2014/0298591 | A1 | 10/2014 | Hazenkamp et al. | |
| 2015/0038640 | A1 | 2/2015 | Kou et al. | |
| 2016/0032224 | A1 | 2/2016 | Kou et al. | |

FOREIGN PATENT DOCUMENTS

| | | | | |
|---|---|---|---|---|
| CN | 1735631 | A | 2/2006 | |
| CN | 101103049 | A | 1/2008 | |
| CN | 101253200 | A | 8/2008 | |
| CN | 104105786 | A | 10/2014 | |
| DE | 4308773 | A1 | 1/1994 | |
| EP | 1861429 | A1 | 12/2007 | |
| WO | 96/30421 | A1 | 10/1996 | |
| WO | WO-2006074969 | A1 * | 7/2006 | C08G 81/025 |
| WO | 2013/113930 | A1 | 8/2013 | |

OTHER PUBLICATIONS

European Search Report for EP Patent Application No. 20169261.3, Issued on Sep. 28, 2020, 4 pages.
International Search Report and Written Opinion received for PCT Patent Application No. PCT/EP2021/059365, mailed on Jun. 11, 2021, 12 pages.

* cited by examiner

*Primary Examiner* — Katarzyna I Kolb
(74) *Attorney, Agent, or Firm* — Faegre Drinker Biddle & Reath LLP

(57) ABSTRACT

The presently claimed invention relates to an amine-modified polymer and method for preparation thereof. The presently claimed invention is also directed to the use of the polymer as dispersant in ink and coating compositions. Polyacrylate polymer is obtained by controlled free radical polymerization of a mixture comprising at least one acrylate monomer. The post-modification of polyacrylate polymers yields amine-modified polymers that provide improved viscosity parameters, without sacrificing the advantages of a well-defined polymer structure.

22 Claims, No Drawings

AMINE-MODIFIED POLYMER, A CONTROLLED FREE RADICAL POLYMERIZATION FOR PREPARING THE SAME AND IMPLEMENTATIONS THEREOF

CROSS-REFERENCE TO RELATED APPLICATIONS

This application is a national stage application (under 35 U.S.C. § 371) of PCT/EP2021/059365, filed Apr. 12, 2021, which claims benefit of European Application No. 20169261.3, filed Apr. 14, 2020, both of which are incorporated herein by reference in their entirety.

FIELD OF THE INVENTION

The presently claimed invention relates to an amine-modified polymer for use as dispersant in ink and coating compositions.

BACKGROUND OF THE INVENTION

The primary component of coating and ink compositions, i.e., the pigment is typically dispersed in a finely divided form to ensure uniformity of colour and associated properties (such as gloss) throughout composition. However, as is well-known, pigments such as carbon black tend to re-aggregate over a period of time, thus leading to an inhomogeneity, loss in gloss or jetness properties and a detrimental increase in viscosity in the compositions. Therefore, dispersants, i.e. polymers which ensure stable pigment distribution throughout a composition, are a critical component in modern ink and coating compositions.

The controlled free radical polymerisation (CFRP) is a tool to tailor the microstructure of polymers (e.g. block copolymers) in a way that is favourable for dispersing and stabilizing pigments. Furthermore, the combination of CFRP with subsequent post-modification of the obtained polymer allows introduction of useful chemical moieties that assist in solubility and overall functioning. With one CFRP-process a large row of different polymer materials for either waterborne or also solventborne high solids systems becomes available.

Although the concept of post-modification of classically prepared polymers is known and, for example, described in DE 4308773, it has not been used broadly, because polymer analogous reactions are in general much more difficult to control, compared to their low molecular weight analogous reactions. U.S. Ser. No. 10/623,685 suggests the post-modification of classically produced acrylic ester polymers for use as dispersing agents.

Due to the polymeric nature of the substrate, post-modification reactions are slower and tend to be incomplete, unless drastic reaction conditions are used such as high temperature or very reactive reagents. However, such measures usually lead to badly defined polymer structures caused by chain scission and cross coupling reactions, resulting in broadening of the molecular weight distribution, branching and gel formation. Another fundamental problem in polymer analogous reactions is, that usually the reaction does not proceed to completion and it is very difficult and costly, if not impossible, to purify the resulting modified polymer from nonconverted reagents or unwanted side products. In order to be industrially applicable, functional reproducibility is a key criterion. Therefore, owing to the uncertainty of obtained product, post-modification of polymers has not found widespread use.

In light of above-mentioned points, it is an object of the presently claimed invention to obtain polymers that are easy to produce and provide improved properties (such as viscosity) without hampering the basic functionality (such as gloss or jetness), while being formulated as dispersants in ink and coating compositions.

SUMMARY OF THE INVENTION

Surprisingly it has been found, that the post-modification, particularly the transamidization, of polyacrylate polymers yields amine-modified polymers that provide improved viscosity parameters, without sacrificing the advantages of a well-defined polymer structure, such as jetness.

Accordingly, the main aspect of the presently claimed invention is directed to a polymer which is obtained by reacting i) at least one polyacrylate P1 which is obtained by controlled free radical polymerization of a mixture M1 comprising at least one acrylate monomer selected from the group consisting of $C_1$-$C_6$alkyl esters of acrylic acid, $C_1$-$C_6$ alkyl esters of methacrylic acid, hydroxy $C_1$-$C_6$ alkyl esters of acrylic acid and hydroxy $C_1$-$C_6$ alkyl esters of methacrylic acid in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $-CH_2$-phenyl, $-CH_3CH$-phenyl, $-(CH_3)_2C$-phenyl, $-(C_5$-$C_6$ cycloalkyl$)_2C-CN$, $-(CH_3)_2CCN$, $-CH_2CH{=}CH_2$, $-CH_3CH-CH{=}CH_2$, $-(C_1$-$C_4$alkyl$)CR_{20}-C(O)$-phenyl, $-(C_1$-$C_4)$alkyl-$CR_{20}-C(O)-(C_1$-$C_4)$alkoxy, $-(C_1$-$C_4)$alkyl-$CR_{20}-C(O)-(C_1$-$C_4)$alkyl, $-(C_1$-$C_4)$alkyl-$CR_{20}-C(O)-N$-di$(C_1$-$C_4)$alkyl, $-(C_1$-$C_4)$alkyl-$CR_{20}-C(O)-NH(C_1$-$C_4)$alkyl, and $-(C_1$-$C_4)$alkyl-$CR_{20}-C(O)-NH_2$, wherein $R_{20}$ is hydrogen or $(C_1$-$C_4)$alkyl, with ii) a mixture M2 comprising at least one alcohol W selected from the group consisting of W1 and W2 and at least one amine Z selected from the group consisting of Z1 and Z2;

wherein,

W1 is $R^1-OH$, wherein $R^1$ is a substituted or unsubstituted, linear or branched $C_8$-$C_{36}$ alkyl;

W2 is at least one polyether alcohol of formula $B-(O-A)_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, and substituted or unsubstituted $C_1$-$C_{24}$ dialkylaryl and n is an integer in the range of $\geq 1$ to $\leq 150$;

Z1 is $NH_2-R^{11}-NR^{12}R^{13}$, and Z2 is $NH_2-R^{11}-Y$, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom.

In another aspect, the presently claimed invention provides a process for preparing the polymer comprising at least the following steps:

a. polymerizing a mixture M1 comprising at least one acrylate monomer in the presence of either a1 or a2;

wherein a1 is at least one nitroxylether of formula $R^{21}R^{22}NOX$ (I) and a2 is at least one stable free nitroxyl radical of formula $R^{21}R^{22}NO\cdot$ (II), wherein $R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —($C_5$-$C_6$ cycloalkyl)$_2$C—CN, —$(CH_3)_2CCN$, —$CH_2CH{=}CH_2$, —$CH_3CH$—$CH{=}CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$) alkyl, and —($C_1$-$C_4$)alkyl-$CR_{20}$—C(O)—$NH_2$, wherein $R_{20}$ is hydrogen or ($C_1$-$C_4$)alkyl; and b. modifying the polyacrylate obtained in step a. by transesterification using at least one alcohol (W) selected from the group consisting of W1 and W2, and transamidization using at least one amine (Z) selected from the group consisting of Z1 and Z2;

wherein W1 is $R^1$—OH, wherein $R^1$ is a substituted or unsubstituted, linear or branched $C_8$-$C_{36}$ alkyl;

W2 is at least one polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, or substituted and unsubstituted $C_1$-$C_{24}$ dialkylaryl and n is an integer in the range of ≥1 to ≤150;

Z1 is $NH_2$—$R^{11}$—$NR^{12}R^{13}$, and Z2 is $NH_2$—$R^{11}$—Y, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen; and Y is a 5- or 6-membered N-containing heterocycle which comprises 1 or 2 nitrogen atoms and 0 or 1 oxygen atom.

In yet another aspect, the presently claimed invention provides a coating composition comprising the polymer.

In yet another aspect, the presently claimed invention provides an ink composition comprising the polymer In another aspect, the presently claimed invention provides the use of the polymer as a dispersant in coating composition or an ink composition.

DETAILED DESCRIPTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

Furthermore, the ranges defined throughout the specification include the end values as well, i.e. a range of 10 to 50 implies that both 10 and 50 are included in the range. For the avoidance of doubt, applicant shall be entitled to any equivalents according to applicable law. Further, the value selectable within the range need not be only integers such as 12, 14, 45, 48, and so on, but also non-integral numbers such as 12.5, 14.2, 45.2, 48.5, and so on.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

As mentioned above, there exists a need for polymers that can function as dispersants for coating or ink compositions. Post-modification of polymers is one way of introducing attractive chemical moieties. However, as mentioned above, the strategy has not been very widely used due to a number of shortcomings. Recently, EP 1 861 429 described the post modification of homo and copolymers prepared by controlled free radical polymerization processes. Herein the polymers obtained by CFRP process are subjected to post-modification by transesterification in the presence of an alcohol. Post-modification by transamidization is not disclosed in EP 1 861 429.

Further investigations in this direction, led to the surprising finding that the dual-post modification of a CFRP polymer in the presence of an alcohol and an amine yields an amine-modified polymer that is capable of improving the dispersant properties (such as viscosity), while maintaining the basic pigment parameters (such as jetness).

Accordingly, one aspect of the presently claimed invention is embodiment 1, which is directed to polymer which is obtained by reacting i) at least one polyacrylate P1 which is obtained by controlled free radical polymerization of a mixture M1 comprising at least one acrylate monomer selected from the group consisting of $C_1$-$C_6$ alkyl esters of acrylic acid, $C_1$-$C_6$ alkyl esters of methacrylic acid, hydroxy $C_1$-$C_6$ alkyl esters of acrylic acid and hydroxy $C_1$-$C_6$ alkyl esters of methacrylic acid in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $—CH_2$-phenyl, $—CH_3CH$-phenyl, $—(CH_3)_2C$-phenyl, $—(C_5$-$C_6$ cycloalkyl$)_2C—CN$, $—(CH_3)_2CCN$, $—CH_2CH═CH_2$, $—CH_3CH—CH═CH_2$, $—(C_1$-$C_4$alkyl$)CR_{20}—C(O)$-phenyl, $—(C_1$-$C_4$)alkyl-$CR_{20}—C(O)—(C_1$-$C_4$)alkoxy, $—(C_1$-$C_4$)alkyl-$CR_{20}—C(O)—(C_1$-$C_4$)alkyl, $—(C_1$-$C_4$)alkyl-$CR_{20}—C(O)—N$-di($C_1$-$C_4$)alkyl, $—(C_1$-$C_4$)alkyl-$CR_{20}—C(O)—NH(C_1$-$C_4$) alkyl, and $—(C_1$-$C_4$)alkyl-$CR_{20}—C(O)—NH_2$, wherein $R_{20}$ is hydrogen or ($C_1$-$C_4$)alkyl, with ii) a mixture M2 comprising at least one alcohol W selected from the group consisting of W1 and W2 and at least one amine Z selected from the group consisting of Z1 and Z2;

wherein,

W1 is $R^1—OH$, wherein $R^1$ is a substituted or unsubstituted, linear or branched $C_8$-$C_{36}$ alkyl;

W2 is at least one polyether alcohol of formula $B—(O-A)_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, and substituted or unsubstituted $C_1$-$C_{24}$ dialkylaryl and n is an integer in the range of ≥1 to ≤150;

Z1 is $NH_2—R^{11}—NR^{12}R^{13}$, and Z2 is $NH_2—R^{11}—Y$, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom.

Another aspect of the presently claimed invention is embodiment 2, which pertains to the controlled free radical polymerization process for preparing the polymer according to embodiment 1 comprising at least the following steps:

a. polymerizing a mixture M1 comprising at least one acrylate monomer in the presence of either a1 or a2;

wherein a1 is at least one nitroxylether of formula $R^{21}R^{22}NOX$ (I) and a2 is at least one stable free nitroxyl radical of formula $R^{21}R^{22}NO\cdot$ (II), wherein $R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $—CH_2$-phenyl, $—CH_3CH$-phenyl, $—(CH_3)_2C$-phenyl, $—(C_5$-$C_6$ cycloalkyl$)_2C—CN$, $—(CH_3)_2CCN$, $—CH_2CH═CH_2$, $—CH_3CH—CH═CH_2$, $—(C_1$-$C_4$alkyl$)CR_{20}—C(O)$-phenyl, $—(C_1$-$C_4$)alkyl-$CR_{20}—C(O)—(C_1$-$C_4$)alkoxy, $—(C_1$-$C_4$)alkyl-$CR_{20}—C(O)—(C_1$-$C_4$)alkyl, $—(C_1$-$C_4$)alkyl-$CR_{20}—C(O)—N$-di($C_1$-$C_4$)alkyl, $—(C_1$-$C_4$)alkyl-$CR_{20}—C(O)—NH(C_1$-$C_4$) alkyl, and $—(C_1$-$C_4$)alkyl-$CR_{20}—C(O)—NH_2$, wherein $R_{20}$ is hydrogen or ($C_1$-$C_4$)alkyl; and b. modifying the polyacrylate obtained in step a. by transesterification using at least one alcohol (W) selected from the group consisting of W1 and W2, and transamidization using at least one amine (Z) selected from the group consisting of Z1 and Z2;

wherein W1 is $R^1—OH$, wherein $R^1$ is a substituted or unsubstituted, linear or branched $C_8$-$C_{36}$ alkyl;

W2 is at least one polyether alcohol of formula $B—(O-A)_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, or substituted and unsubstituted $C_1$-$C_{24}$ dialkylaryl and n is an integer in the range of ≥1 to ≤150;

Z1 is $NH_2—R^{11}—NR^{12}R^{13}$, and Z2 is $NH_2—R^{11}—Y$, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen; and Y is a 5- or 6-membered N-containing heterocycle which comprises 1 or 2 nitrogen atoms and 0 or 1 oxygen atom.

Within the context of the presently claimed invention, the term "controlled free radical polymerization" or "CRFP", as used herein, refers to the process for producing defined oligomeric homopolymers and copolymers, including block and graft copolymers, by controlled or "living" growth of polymer chains. The process allows enhanced control over polydispersity and allows production of polymers within a narrow molecular weight range. Herein, the process involves the use of initiators of the partial formula R'R"N—O—X. In the polymerization process, the free radical species R'R"N—

O· and ·X are generated ·X is a free radical group, e.g. a tert.-butyl or cyanoisopropyl radical, capable of polymerizing monomer units containing ethylene groups.

The term "alkyl", as used herein, used herein, refers to an acrylic saturated aliphatic group, including linear or branched alkyl saturated hydrocarbon radicals, denoted by a general formula $C_nH_{2n+1}$ and wherein n is the number of carbon atoms such as 1, 2, 3, 4, etc.

For the purposes of the presently claimed invention, the unsubstituted linear $C_1$-$C_{18}$ alkyl is preferably selected from the group consisting of methyl, ethyl, propyl, butyl, pentyl, hexyl, heptyl, octyl, nonyl, decyl, undecyl and dodecyl; more preferably selected from the group consisting of methyl, ethyl, propyl, butyl, pentyl, hexyl, heptyl, octyl, nonyl, decyl, undecyl and dodecyl; even more preferably selected from the group consisting of methyl, ethyl, propyl, butyl, pentyl, hexyl, heptyl, octyl and nonyl; most preferably selected from the group consisting of ethyl, propyl, butyl, pentyl, hexyl and heptyl; and in particular selected from the group consisting of ethyl, propyl, butyl, pentyl, hexyl, heptyl, octyl, nonyl and decyl.

In a preferred embodiment, the unsubstituted branched $C_1$-$C_{18}$ alkyl is preferably selected from the group consisting of isopropyl, iso-butyl, sec-butyl, tert-butyl, isopentyl, neopentyl, 3-methylhexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl and 3,3-dimethyl butyl, 1-methyl-2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, isodecyl, iso-dodecyl, iso-tetradecyl, iso-hexadecyl and iso-octadecyl, more preferably selected from the group consisting of 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl and iso-dodecyl.

In a preferred embodiment, the substituted, linear or branched $C_1$-$C_{18}$ alkyl refers to a branched or linear saturated hydrocarbon group having $C_1$-$C_{18}$ carbon atoms substituted with functional groups selected from the group consisting of hydroxy, alkoxy, C(═O)—$R_4$, CN, C(═O)—$OR_4$, C(═O)—$NR_5$, $NR_5$ and $SR_4$, wherein $R_4$ and $R_5$ are independently selected from the group consisting of hydrogen, substituted or unsubstituted, linear or branched $C_1$-$C_{18}$ alkyl, substituted or unsubstituted, linear or branched $C_2$-$C_{18}$ alkenyl, substituted or unsubstituted $C_5$-$C_{18}$ cycloalkyl, substituted or unsubstituted $C_5$-$C_{12}$ cycloalkenyl, substituted or unsubstituted $C_8$-$C_{18}$ aryl and substituted or unsubstituted $C_7$-$C_{18}$ arylalkyl.

In a preferred embodiment, the substituted, linear or branched $C_1$-$C_{18}$ alkyl refers to a branched or linear saturated hydrocarbon group having $C_1$-$C_{18}$ carbon atoms substituted with functional groups selected from the group consisting of hydroxy, alkoxy, C(═O)—$R_4$, CN, C(═O)—$OR_4$, C(═O)—$NR_5$, $NR_5$ and $SR_4$, preferably selected from the group consisting of 1-hydroxy methyl, 1-methoxy methyl, 1-hydroxy ethyl, 1-hydroxy propyl, 1-hydroxy butyl, 1-hydroxy pentyl, 1-hydroxy hexyl, 1-hydroxy heptyl, 1-hydroxy octyl, 1-hydroxy nonyl, 1-hydroxy decyl, 1-hydroxy undecyl, 1-hydroxy dodecyl, 1-methoxy methyl, 1-methoxy ethyl, 1-methoxy propyl, 1-methoxy butyl, 1-methoxy pentyl, 1-methoxy hexyl, 1-methoxy heptyl, 1-methoxy octyl, 1-methoxy nonyl, 1-methoxy decyl, 1-methoxy undecyl, 1-methoxy dodecyl, 1-hydroxy tridecyl, 1-hydroxy tetradecyl, 1-hydroxy pentadecyl, 1-hydroxy hexadecyl, 1-hydroxy heptadecyl, 1-hydroxy octadecyl, 2-methoxy propyl, 2-methoxy butyl, 2-methoxy pentyl, 2-methoxy hexyl, 2-methoxy heptyl, 2-methoxy octyl, 2-methoxy nonyl, 2-methoxy decyl, 2-methoxy undecyl, 2-methoxy dodecyl, 2-methoxy tridecyl, 2-methoxy tetradecyl, 2-methoxy pentadecyl, 2-methoxy hexadecyl, 2-methoxy heptadecyl, 2-methoxy octadecyl, 1-acetoxy methyl, 1-acetoxy ethyl, 1-acetoxy propyl, 1-acetoxy butyl, 1-acetoxy pentyl, 1-acetoxy hexyl, 1-acetoxy heptyl, 1-acetoxy octyl, 1-acetoxy nonyl, 1-acetoxy decyl, 1-acetoxy undecyl, 1-acetoxy dodecyl, 1-acetoxy tridecyl, 1-acetoxy tetradecyl, 1-acetoxy pentadecyl, 1-acetoxy hexadecyl, 1-acetoxy heptadecyl, 1-acetoxy octadecyl, 1-cyano methyl, 1-cyano ethyl, 1-cyano propyl, 1-cyano butyl, 1-cyano pentyl, 1-cyano hexyl, 1-cyano heptyl, 1-cyano octyl, 1-cyano nonyl, 1-cyano decyl, 1-cyano undecyl, 1-cyano dodecyl, 1-cyano dodecyl, 1-cyano tridecyl, 1-cyano tetradecyl, 1-cyano pentadecyl, 1-cyano hexadecyl, 1-cyano heptadecyl, 1-cyano octadecyl, 2-cyano propyl, 2-cyano butyl, 2-cyano pentyl, 2-cyano hexyl, 2-cyano heptyl, 2-cyano octyl, 2-cyano nonyl, 2-cyano decyl, 2-cyano undecyl, 2-cyano dodecyl, 2-cyano tridecyl, 2-cyano tetradecyl, 2-cyano pentadecyl, 2-cyano hexadecyl, 2-cyano heptadecyl, 2-cyano octadecyl, 1-thioyl methyl, 1-thioyl ethyl, 1-thioyl propyl, 1-thioyl butyl, 1-thioyl pentyl, 1-thioyl hexyl, 1-thioyl heptyl, 1-thioyl octyl, 1-thioyl nonyl, 1-thioyl decyl, 1-thioyl undecyl and 1-thioyl dodecyl, 1-thioyl tridecyl, 1-thioyl tetradecyl, 1-thioyl pentadecyl, 1-thioyl hexadecyl, 1-thioyl heptadecyl and 1-thioyl octadecyl.

In a preferred embodiment of the presently claimed invention, the at least one acrylate monomer selected from the group consisting of $C_1$-$C_8$ alkyl ester of acrylic acid, preferably $C_2$-$C_5$ alkyl ester of acrylic acid, in embodiment 1 or embodiment 2.

In a more preferred embodiment of the presently claimed invention, the at least one acrylate monomer is selected from the group consisting of n-butylacrylate, methyl acrylate and ethylacrylate, in embodiment 1 or embodiment 2.

In a more preferred embodiment of the presently claimed invention, the at least one acrylate monomer selected from the group consisting of n-butyl(meth)acrylate, methyl(meth) acrylate and ethyl(meth)acrylate, in embodiment 1 or embodiment 2.

In a most preferred embodiment of the presently claimed invention, the at least one acrylate monomer is n-butyl (meth)acrylate, in embodiment 1 or embodiment 2.

In a preferred embodiment of the presently claimed invention, the at least one acrylate monomer selected from the group consisting of hydroxy $C_1$-$C_6$ alkyl ester of acrylic acid, preferably hydroxy $C_2$-$C_5$ alkyl ester of acrylic acid, in embodiment 1 or embodiment 2.

In a most preferred embodiment of the presently claimed invention, the at least one acrylate monomer is 4-hydroxybutylacrylate, in embodiment 1 or embodiment 2.

In a preferred embodiment of the presently claimed invention, the at least one acrylate monomer selected from the group consisting of hydroxy $C_1$-$C_6$ alkyl ester of methacrylic acid, preferably hydroxy $C_2$-$C_5$ alkyl ester of methacrylic acid, in embodiment 1 or embodiment 2.

In a most preferred embodiment of the presently claimed invention, the at least one acrylate monomer is 4-hydroxybutylmethacrylate, in embodiment 1 or embodiment 2.

In a preferred embodiment of the presently claimed invention, the structural element NOX or NO· may be part of a cyclic ring system or substituted to form an acyclic structure, in embodiment 1 or embodiment 2.

In a more preferred embodiment of the presently claimed invention, the structural element NOX or NO· is part of a 5 or 6-membered heterocyclic ring, which optionally has an additional nitrogen or oxygen atom in the ring system, in embodiment 1 or embodiment 2.

In a more preferred embodiment of the presently claimed invention, the nitroxylether of formula $R^{21}R^{22}NOX$ is a compound of formula (Ic), (Id) or (Ie), Formula Ic

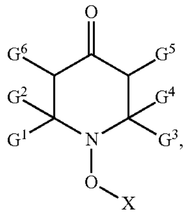

Formula Id

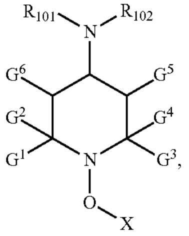

or

Formula Ie

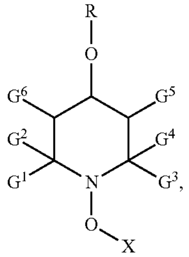

wherein,

R is hydrogen, $C_1$-$C_{18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$ alkyl, $C_5$-$C_7$ cycloalkyl, $C_7$-$C_8$ aralkyl, $C_2$-$C_{18}$ alkanoyl, $C_3$-$C_5$ alkenoyl or benzoyl;

$R_{102}$ is $C_1$-$C_{18}$ alkyl, $C_5$-$C_7$ cycloalkyl, $C_2$-$C_8$ alkenyl unsubstituted or substituted by a cyano, carbonyl or carbamide group, or is glycidyl, a group of the formula —CH2CH(OH)—Z or of the formula —CO—Z or —CONH—Z wherein Z is hydrogen, methyl or phenyl;

$G_6$ is hydrogen and $G_6$ is hydrogen or $C_1$-$C_4$ alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, ($C_5$-$C_6$ cycloalkyl)$_2CCN$, $(CH_3)_2CCN$,

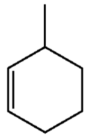

,

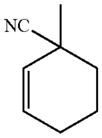

,

—$CH_2CH$═$CH_2$, $CH_3CH$—$CH$═$CH_2$ ($C_1$-$C_4$ alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl, in embodiment 1 or embodiment 2.

In another preferred embodiment of the presently claimed invention, the nitroxylether of formula $R^{21}R^{22}NOX$ is a compound of formulae (If), (Ig), (Ih), (Ii), (Ij) or (Ik), Formula If

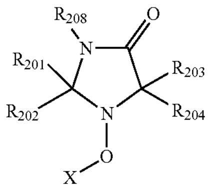

Formula Ig

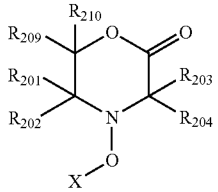

Formula Ih

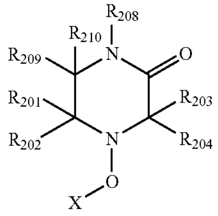

Formula Ii

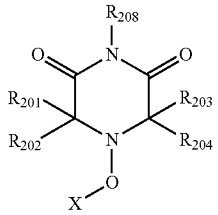

Formula Ij

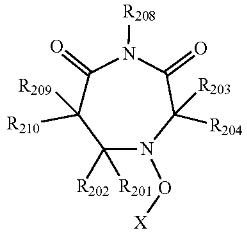

-continued

Formula Ik

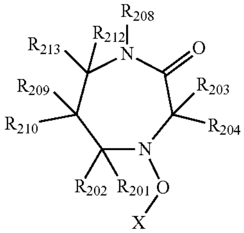

wherein, $R_{201}$, $R_{202}$, $R_{203}$ and $R_{204}$ independently of each other are $C_1$-$C_{18}$ alkyl, $C_3$-$C_{18}$ alkenyl, $C_3$-$C_{18}$alkinyl, $C_1$-$C_{18}$ alkyl, $C_3$-$C_{18}$ alkenyl, $C_3$-$C_{18}$ alkinyl which are substituted by OHYDROGEN, halogen or a group —O—C(O)—$R_{205}$, $C_2$-$C_{18}$ alkyl which is interrupted by at least one O atom and/or $NR_{205}$ group, $C_3$-$C_{12}$ cycloalkyl or $C_6$-$C_{10}$ aryl or $R_{201}$ and $R_{202}$ and/or $R_{203}$ and $R_{204}$ together with the linking carbon atom form a C3-C12cycloalkyl radical; $R_{205}$, $R_{206}$ and $R_{207}$ independently are hydrogen, $C_1$-$C_{18}$ alkyl or $C_6$-$C_{10}$ aryl; $R_{208}$ is hydrogen, OHYDROGEN, $C_1$-$C_{18}$ alkyl, $C_3$-$C_{18}$ alkenyl, $C_3$-$C_{18}$ alkinyl, $C_1$-$C_{18}$ alkyl, $C_3$-$C_{18}$ alkenyl, $C_3$-$C_{18}$ alkinyl which are substituted by one or more OHYDROGEN, halogen or a group —O—C(O)—$R_{205}$, $C_2$-$C_{18}$ alkyl which is interrupted by at least one O atom and/or $NR_{205}$ group, $C_3$-$C_{12}$ cycloalkyl or $C_6$-$C_{10}$ aryl, $C_7$-$C_9$ phenylalkyl, $C_5$-$C_{10}$ heteroaryl, —C(O)—$C_1$-$C_{18}$ alkyl, —O$C_1$-$C_{18}$ alkyl or —COO$C_1$-$C_{18}$ alkyl; $R_{209}$, $R_{210}$, $R_{211}$ and $R_{212}$ are independently hydrogen, phenyl or $C_1$-$C_{18}$ alkyl; and X is selected from the group consisting of —$CH_2$-phenyl, $CH_3CH$-phenyl, $(CH_3)_2C$-phenyl, ($C_5$-$C_6$ cycloalkyl)$_2$CCN, $(CH_3)_2CCN$,

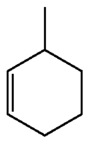,
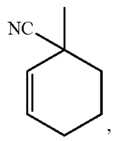,

—$CH_2CH{=}CH_2$, $CH_3CH$—$CH{=}CH_2$ ($C_1$-$C_4$ alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl, in embodiment 1 or embodiment 2.

In a more preferred embodiment of the presently claimed invention, the nitroxylether of formula $R^{21}R^{22}NOX$ is a compound of formula (If), (Ig), (Ih), (Ii), (Ij) and (Ik) at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$ cycloalkyl radical and one of the remaining substituents is ethyl, propyl or butyl, in embodiment 1 or embodiment 2.

In a most preferred embodiment of the presently claimed invention, X is $CH_3CH$-phenyl, in embodiment 1 or embodiment 2.

In another preferred embodiment of the presently claimed invention, the at least one nitroxylether of formula $R^{21}R^{22}NOX$ is compound of formula III, Formula III

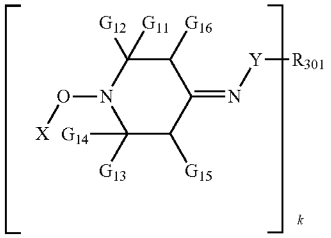

wherein, $G_{11}$, $G_{12}$, $G_{13}$ and $G_{14}$ are independently $C_1$-$C_4$ alkyl or $G_{11}$ and $G_{12}$ together and $G_{13}$ and $G_{14}$ together, or $G_{11}$ and $G_{12}$ together or $G_{13}$ and $G_{14}$ together are pentamethylene; $G_{15}$ and $G_{16}$ are each independently of the other hydrogen or $C_1$-$C_4$ alkyl;

X is as defined above;

k is 1, 2, 3, or 4

Y is O or $NR_{302}$ or when k is 1 and $R_{301}$ represents alkyl or aryl Y is additionally a direct bond; $R_{302}$ is HYDROGEN, $C_1$-$C_{18}$ alkyl or phenyl, in embodiment 1 or embodiment 2;

if k is 1,

In a more preferred embodiment of the presently claimed invention, $R_{301}$ is HYDROGEN, straight or branched $C_1$-$C_{18}$ alkyl, $C_3$-$C_{18}$ alkenyl or $C_3$-$C_{18}$ alkinyl, which may be unsubstituted or substituted, by one or more OHYDROGEN, $C_1$-$C_8$ alkoxy, carboxy, $C_1$-$C_8$ alkoxycarbonyl; $C_5$-$C_{12}$ cycloalkyl or $C_5$-$C_{12}$cycloalkenyl; phenyl, $C_7$-$C_9$ phenylalkyl or naphthyl which may be unsubstituted or substituted by one or more $C_1$-$C_8$ alkyl, halogen, OHYDROGEN, $C_1$-$C_8$ alkoxy, carboxy, $C_1$-$C_8$ alkoxycarbonyl; —C(O)—$C_1$-$C_{36}$ alkyl, or an acyl moiety of a α,β-unsaturated carboxylic acid having 3 to 5 carbon atoms or of an aromatic carboxylic acid having 7 to 15 carbon atoms; —$SO_3$-$Q^+$, —PO(O-$Q^+$)$_2$, —P(O)(O$C_1$-$C_8$ alkyl$_2$)$_2$, —P(O)(O$H_2$)$_2$, —$SO_2$—OHYDROGEN, —$SO_2$—$C_1$-$C_8$ alkyl, —CO—NH—$C_1$-$C_8$ alkyl, —$CONH_2$, COO—$C_1$-$C_8$ alkyl$_2$, COOH or Si(Me)$_3$, wherein $Q^+$ is $H^+$, ammonium or an alkali metal cation, in embodiment 1 or embodiment 2;

if k is 2, $R_{301}$ is $C_1$-$C_{18}$ alkylene, $C_3$-$C_{18}$ alkenylene or $C_3$-$C_{18}$ alkinylene, which may be unsubstituted or substituted, by one or more OHYDROGEN, $C_1$-$C_8$ alkoxy, carboxy, $C_1$-$C_8$ alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms, in embodiment 1 or embodiment 2;

if k is 3, $R_{301}$ is a trivalent radical of an aliphatic, cycloaliphatic or aromatic tricarboxylic acid, in embodiment 1 or embodiment 2;

and if k is 4, $R_{301}$ is a tetravalent radical of an aliphatic, cycloaliphatic or aromatic tetracarboxylic acid, in embodiment 1 or embodiment 2.

In another preferred embodiment of the presently claimed invention, $G_{16}$ is hydrogen and $G_{15}$ is hydrogen or $C_1$-$C_4$ alkyl, in particular methyl, and $G_{11}$ and $G_{12}$ are methyl and $G_{13}$ and $G_{14}$ are ethyl or propyl, in embodiment 1 or embodiment 2.

In an even more preferred embodiment of the presently claimed invention, the nitroxylether of formula $R^{21}R^{22}NOX$ is a compound of formula (Ia)

Formula Ia

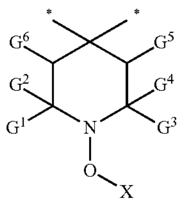

wherein,

- $G^1$, $G^2$, $G^3$, $G^4$ are independently $C_1$-$C_6$ alkyl or $G^1$ and $G^2$ or $G^3$ and $G^4$, or $G^1$ and $G^2$ and $G^3$ and $G^4$ together form a $C_5$-$C_{12}$ cycloalkyl group;
- $G^5$, $G^6$ independently are HYDROGEN, $C_1$-$C_{18}$ alkyl, phenyl, naphthyl or a group $COOC_1$-$C_{18}$ alkyl;
- X is selected from the group consisting of —$CH_2$-phenyl, $CH_3CH$-phenyl, $(CH_3)_2C$-phenyl, $(C_5$-$C_6$cycloalkyl$)_2CCN$, $(CH_3)_2CCN$, —$CH_2CH{=}CH_2$, $CH_3CH$—$CH{=}CH_2$ $(C_1$-$C_4$alkyl$)CR_{20}$—C(O)-phenyl, $(C_1$-$C_4)$alkyl-$CR_{20}$—C(O)—$(C_1$-$C_4)$alkoxy, $(C_1$-$C_4)$alkyl-$CR_{20}$—C(O)—$(C_1$-$C_4)$alkyl, $(C_1$-$C_4)$alkyl-$CR_{20}$—C(O)—N-di$(C_1$-$C_4)$alkyl, $(C_1$-$C_4)$alkyl-$CR_{20}$—C(O)—$NH(C_1$-$C_4)$alkyl, $(C_1$-$C_4)$alkyl-$CR_{20}$—C(O)—$NH_2$, wherein $R_{20}$ is hydrogen or $(C_1$-$C_4)$alkyl and
- * denotes a valence, in embodiment 1 or embodiment 2.

In a preferred embodiment of the presently claimed invention, the nitroxylether of formula $R^{21}R^{22}NOX$ is a compound of formula (Ia) wherein, $G^1$, $G^2$, $G^3$, $G^4$ are independently $C_1$-$C_4$ alkyl or $G^1$ and $G^2$ or $G^3$ and $G^4$, or $G^1$ and $G^2$ and $G^3$ and $G^4$ together form a $C_5$-$C_{12}$ cycloalkyl group, in embodiment 1 or embodiment 2.

In another preferred embodiment of the presently claimed invention, the nitroxylether of formula $R^{21}R^{22}NOX$ is a compound of formula (Ia) wherein, $G^1$, $G^2$, $G^3$, $G^4$ are independently $C_1$-$C_4$ alkyl, in embodiment 1 or embodiment 2.

In a preferred embodiment of the presently claimed invention, the nitroxylether of formula $R^{21}R^{22}NOX$ is a compound of formula (Ia) wherein, $G^5$, $G^6$ independently are H or $C_1$-$C_8$ alkyl, in embodiment 1 or embodiment 2.

In another preferred embodiment of the presently claimed invention, the nitroxylether of formula $R^{21}R^{22}NOX$ is a compound of formula (Ia) wherein, $G^5$, $G^6$ independently are H or $C_1$-$C_3$ alkyl, in embodiment 1 or embodiment 2.

In a preferred embodiment of the presently claimed invention, the nitroxylether of formula $R^{21}R^{22}NOX$ is a compound of formula (Ia) wherein, X is selected from the group consisting of —$CH_2$-phenyl, $CH_3CH$-phenyl, or $(CH_3)_2C$-phenyl, in embodiment 1 or embodiment 2.

In another preferred embodiment of the presently claimed invention, the nitroxylether of formula $R^{21}R^{22}NOX$ is a compound of formula (Ia) wherein, X is selected from the group consisting of $CH_3CH$-phenyl, in embodiment 1 or embodiment 2.

In a more preferred embodiment of the presently claimed invention, the at least one nitroxylether is selected from the formulae

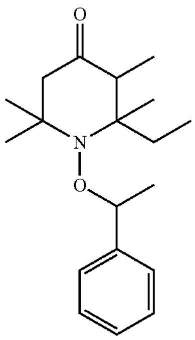,

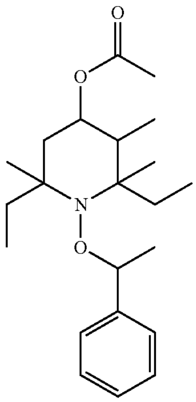,

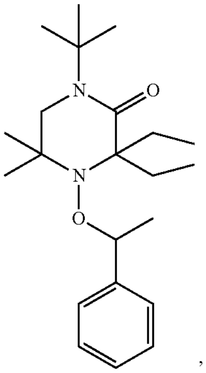,

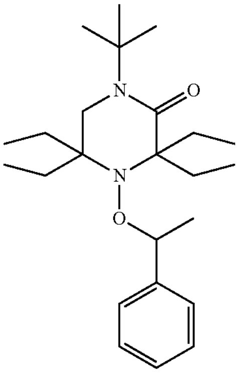,

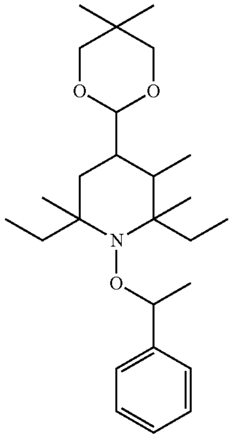,

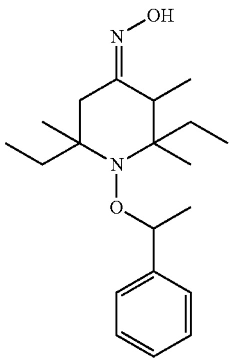

or

-continued

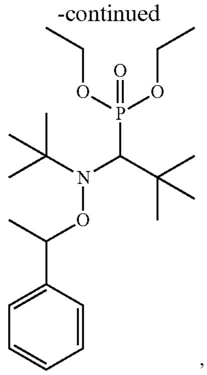

, in embodiment 1 or embodiment 2.

In a most preferred embodiment of the presently claimed invention, the at least one nitroxylether is Formula Ib

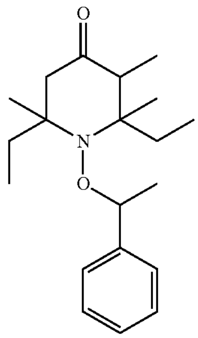

, in embodiment 1 or embodiment 2.

In a preferred embodiment of the presently claimed invention, the stable free nitroxyl radical of formula $R^{21}R^{22}NO\cdot$ is a structural element of formula (IIa)

Formula IIa

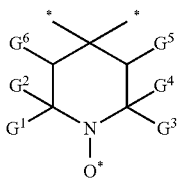

wherein, $G^1$, $G^2$, $G^3$, $G^4$ are independently $C_1$-$C_6$ alkyl or $G^1$ and $G^2$ or $G^3$ and $G^4$, or $G^1$ and $G^2$ and $G^3$ and $G^4$ together form a $C_5$-$C_{12}$ cycloalkyl group;

$G^5$, $G^6$ independently are HYDROGEN, $C_1$-$C_{18}$ alkyl, phenyl, naphthyl or a group $COOC_1$-$C_{18}$ alkyl;

X is selected from the group consisting of —$CH_2$-phenyl, $CH_3CH$-phenyl, $(CH_3)_2C$-phenyl, ($C_5$-$C_6$ cycloalkyl)$_2$CCN, $(CH_3)_2CCN$, —$CH_2CH$═$CH_2$, $CH_3CH$—$CH$═$CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl and

* denotes a valence, in embodiment 1 or embodiment 2.

In a preferred embodiment of the presently claimed invention, the stable free nitroxyl radical of formula $R^{21}R^{22}NO\cdot$ is a compound of formula (IIa) wherein, $G^1$, $G^2$, $G^3$, $G^4$ are independently $C_1$-$C_4$ alkyl or $G^1$ and $G^2$ or $G^3$ and $G^4$, or $G^1$ and $G^2$ and $G^3$ and $G^4$ together form a $C_5$-$C_{12}$ cycloalkyl group, in embodiment 1 or embodiment 2.

In another preferred embodiment of the presently claimed invention, the stable free nitroxyl radical of formula $R^{21}R^{22}NO\cdot$ is a compound of formula (IIa) wherein, $G^1$, $G^2$, $G^3$, $G^4$ are independently $C_1$-$C_4$ alkyl, in embodiment 1 or embodiment 2.

In a preferred embodiment of the presently claimed invention, the stable free nitroxyl radical of formula $R^{21}R^{22}NO\cdot$ is a compound of formula (IIa) wherein, $G^5$, $G^6$ independently are H or $C_1$-$C_8$ alkyl, in embodiment 1 or embodiment 2.

In another preferred embodiment of the presently claimed invention, the stable free nitroxyl radical of formula $R^{21}R^{22}NO\cdot$ is a compound of formula (IIa) wherein, $G^5$, $G^6$ independently are H or $C_1$-$C_3$ alkyl, in embodiment 1 or embodiment 2.

In a preferred embodiment of the presently claimed invention, the stable free nitroxyl radical of formula $R^{21}R^{22}NO\cdot$ is a compound of formula (IIa) wherein, X is selected from the group consisting of —$CH_2$-phenyl, $CH_3CH$-phenyl, or $(CH_3)_2C$-phenyl, in embodiment 1 or embodiment 2.

In another preferred embodiment of the presently claimed invention, the stable free nitroxyl radical of formula $R^{21}R^{22}NO\cdot$ is a compound of formula (IIa) wherein, X is selected from the group consisting of $CH_3CH$-phenyl, in embodiment 1 or embodiment 2.

In another preferred embodiment of the presently claimed invention, the at least one stable free nitroxyl radical of formula $R^{21}R^{22}NO\cdot$ is a compound of formula III', Formula III'

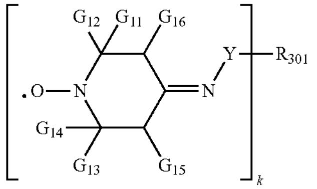

wherein, $G_{11}$, $G_{12}$, $G_{13}$ and $G_{14}$ are independently $C_1$-$C_4$ alkyl or $G_{11}$ and $G_{12}$ together and $G_{13}$ and $G_{14}$ together, or $G_{11}$ and $G_{12}$ together or $G_{13}$ and $G_{14}$ together are pentamethylene; $G_{15}$ and $G_{16}$ are each independently of the other hydrogen or $C_1$-$C_4$ alkyl;

X is as defined above;

k is 1, 2, 3, or 4

Y is O or $NR_{302}$ or when k is 1 and $R_{301}$ represents alkyl or aryl Y is additionally a direct bond; $R_{302}$ is HYDROGEN, $C_1$-$C_{18}$ alkyl or phenyl, in embodiment 1 or embodiment 2;

if k is 1,

In a more preferred embodiment of the presently claimed invention, $R_{301}$ is HYDROGEN, straight or branched $C_1$-$C_{18}$ alkyl, $C_3$-$C_{18}$ alkenyl or $C_3$-$C_{18}$ alkinyl, which may be unsubstituted or substituted, by one or more OHYDROGEN, $C_1$-$C_8$ alkoxy, carboxy, $C_1$-$C_8$ alkoxycarbonyl; $C_5$-$C_{12}$ cycloalkyl or $C_5$-$C_{12}$cycloalkenyl; phenyl, $C_7$-$C_9$ phenylalkyl or naphthyl which may be unsubstituted or substituted by one or more $C_1$-$C_8$ alkyl, halogen, OHYDROGEN, $C_1$-$C_8$ alkoxy, carboxy, $C_1$-$C_8$ alkoxycarbonyl; —C(O)—$C_1$-$C_{36}$ alkyl, or an acyl moiety of a α,β-unsaturated carboxylic acid having 3 to 5 carbon atoms or of an aromatic carboxylic acid having 7 to 15 carbon atoms; $—SO_3$-$Q^+$, —PO(O-$Q^+$)$_2$, —P(O)($OC_1$-$C_8$ alkyl$_2$)$_2$, —P(O)($OH_2$)$_2$, $—SO_2$—OHYDROGEN, $—SO_2$—$C_1$-$C_8$ alkyl, —CO—NH—$C_1$-$C_8$ alkyl, $—CONH_2$, COO—$C_1$-$C_8$ alkyl$_2$, COOH or $Si(Me)_3$, wherein $Q^+$ is $H^+$, ammonium or an alkali metal cation, in embodiment 1 or embodiment 2;

if k is 2, $R_{301}$ is $C_1$-$C_{18}$ alkylene, $C_3$-$C_{18}$ alkenylene or $C_3$-$C_{18}$ alkinylene, which may be unsubstituted or substituted, by one or more OHYDROGEN, $C_1$-$C_8$ alkoxy, carboxy, $C_1$-$C_8$ alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms, in embodiment 1 or embodiment 2;

if k is 3, $R_{301}$ is a trivalent radical of an aliphatic, cycloaliphatic or aromatic tricarboxylic acid, in embodiment 1 or embodiment 2;

and if k is 4, $R_{301}$ is a tetravalent radical of an aliphatic, cycloaliphatic or aromatic tetracarboxylic acid, in embodiment 1 or embodiment 2.

In a more preferred embodiment of the presently claimed invention, the stable free nitroxyl radical of formula $R^{21}R^{22}NO\cdot$ is a structural element of formulae (A'), (B') or (C'), Formula A'

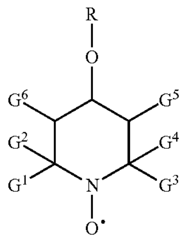

Formula B'

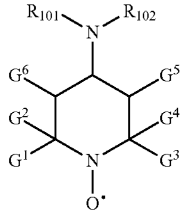

Formula C'

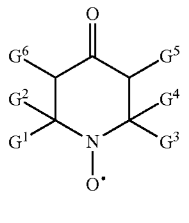

wherein

R is hydrogen, $C_1$-$C_{18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$ alkyl, $C_5$-$C_7$ cycloalkyl, $C_7$-$C_8$ aralkyl, $C_2$-$C_{18}$ alkanoyl, $C_3$-$C_5$ alkenoyl or benzoyl;

$R_{102}$ is $C_1$-$C_{18}$ alkyl, $C_5$-$C_7$ cycloalkyl, $C_2$-$C_8$ alkenyl unsubstituted or substituted by a cyano, carbonyl or carbamide group, or is glycidyl, a group of the formula —CH2CH(OH)—Z or of the formula —CO—Z or —CONH—Z wherein Z is hydrogen, methyl or phenyl;

$G_6$ is hydrogen and $G_6$ is hydrogen or $C_1$-$C_4$ alkyl, $G_1$ and $G_3$ are methyl and $G_2$ and $G_4$ are ethyl or propyl or $G_1$ and $G_2$ are methyl and $G_3$ and $G_4$ are ethyl or propyl, in embodiment 1 or embodiment 2.

In another preferred embodiment of the presently claimed invention, the alkyl radicals may be linear or branched, in embodiment 1 or embodiment 2. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl, in embodiment 1 or embodiment 2.

In another preferred embodiment of the presently claimed invention, the alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl, in embodiment 1 or embodiment 2.

In a more preferred embodiment of the presently claimed invention, the alkenyl contains 3 to 12 carbon atoms, particularly preferred range contains 3 to 6 carbon atoms, in embodiment 1 or embodiment 2.

In another preferred embodiment of the presently claimed invention, the alkinyl with 3 to 18 carbon atoms is a linear or branched radical as for example propinyl, 2-butinyl, 3-butinyl, n-2-octinyl, or n-2-octadecinyl. Preferred is alkinyl with 3 to 12, particularly preferred with 3 to 6 carbon atoms, in embodiment 1 or embodiment 2.

In a more preferred embodiment of the presently claimed invention, the hydroxy substituted alkyl are hydroxy propyl, hydroxy butyl or hydroxy hexyl, in embodiment 1 or embodiment 2.

In a more preferred embodiment of the presently claimed invention, the halogen substituted alkyl are dichloropropyl, monobromobutyl or trichlorohexyl, in embodiment 1 or embodiment 2.

In a more preferred embodiment of the presently claimed invention, the $C_2$-$C_{18}$ alkyl interrupted by at least one O atom is for example $—CH_2—CH_2—O—CH_2—CH_3$, $—CH_2—CH_2—O—CH_3$- or $—CH_2—CH_2—O—CH_2—CH_2CH_2—O—CH_2—CH_3$—. It is preferably derived from polyethlene glycol. A general description is $—((CH_z)_a—O)_b—H/CH_3$, wherein a is a number from 1 to 6 and b is a number from 2 to 10, in embodiment 1 or embodiment 2.

In a more preferred embodiment of the presently claimed invention, the $C_2$-$C_{18}$ alkyl interrupted by at least one $NR_{205}$ group may be generally described as $—((CH_2)a$-$NR_{205})_b—H/CH_3$, wherein a, b and $R_{205}$ are as defined above, in embodiment 1 or embodiment 2.

In an another more preferred embodiment of the presently claimed invention, the $C_3$-$C_{12}$ cycloalkyl is typically, cyclopropyl, cyclopentyl, methylcyclopentyl, dimethylcyclopentyl, cyclohexyl, methylcyclohexyl or trimethylcyclohexyl, in embodiment 1 or embodiment 2.

In an another more preferred embodiment of the presently claimed invention, the $C_6$-$C_{10}$ aryl is for example phenyl or naphthyl, but also comprised are $C_1$-$C_4$ alkyl substituted phenyl, $C_1$-$C_4$ alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene, in embodiment 1 or embodiment 2.

In a more preferred embodiment of the presently claimed invention, the alkoxy substituents are typically methoxy, ethoxy, propoxy or butoxy and their corresponding isomers, in embodiment 1 or embodiment 2.

In a more preferred embodiment of the presently claimed invention, the $C_7$-$C_9$ phenylalkyl is benzyl, phenylethyl or phenylpropyl, in embodiment 1 or embodiment 2.

In a more preferred embodiment of the presently claimed invention, the $C_5$-$C_{10}$ heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine, in embodiment 1 or embodiment 2.

In a more preferred embodiment of the presently claimed invention, the R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or 33-(3,5-di-tert-butyl-4-hydrox-phenyl)propionyl radical, in embodiment 1 or embodiment 2.

In a more preferred embodiment of the presently claimed invention, the at least one stable free nitroxyl radical is selected from the formulae

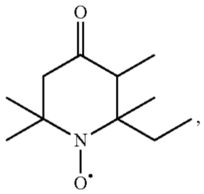
,
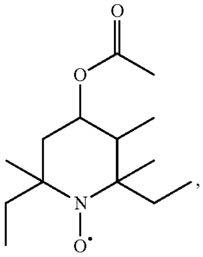
,
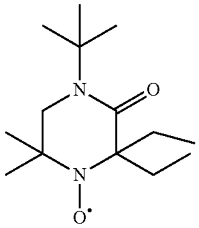
,
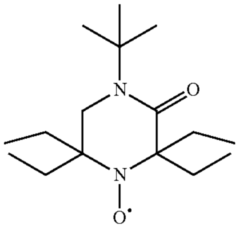
,
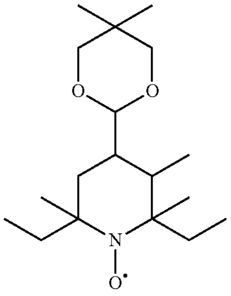
,
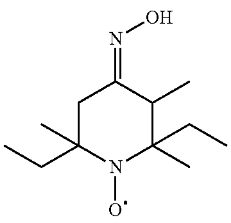
or

-continued

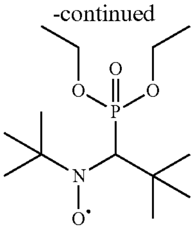
, in embodiment 1 or embodiment 2.

In a most preferred embodiment of the presently claimed invention, the at least one stable free nitroxyl radical is Formula Ib'

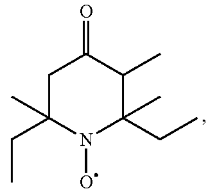
, in embodiment 1 or embodiment 2.

In a preferred embodiment of the presently claimed invention, the reaction with at least one alcohol W is a transesterification reaction, in embodiment 1 or embodiment 2.

The term "transesterification" refers to a reaction involving the replacement of alcohol radical in an ester group of the polymer or copolymer by another alcohol radical. Preferably the alcohol radical to be replaced is methanol, ethanol, propanol or butanol. Typically, the transesterification reaction is carried out at elevated temperatures, typically 70-200° C., by reacting the CFRP polymer with the corresponding alcohol using well-known catalysts, such as tetraisopropyltitanate, tetrabutyltitanate, alkali- or earth alkali alcoholates like NaOMe or LiOMe. Typically, the low boiling product alcohol is removed from the transterification reaction mixture by distillation to shift the reaction equilibrium. If needed, catalyst residues may be removed by adsorption or extraction or otherwise processed or inactivated by known methods, like hydrolysis with water or acids. The choice of the replacing alcohol is important as the replacing alcohol controls the properties of the resulting copolymer.

The term "alcohol", as used herein, refers organic compounds that carry at least one hydroxyl functional group (C—OH) bound to their aliphatic substructure. Said alcohol is utilized to carry out transesterification as mentioned above. The preferred alcohol is of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, and substituted or unsubstituted $C_1$-$C_{24}$ dialkylaryl and n is an integer in the range of ≥1 to ≤150. Particularly preferred is an unsubstituted linear or branched $C_8$-$C_{36}$ alkyl mono alcohol. An example is iso $C_{12}$-$C_{15}$ alcohol. Preferably, the alcohol is a primary or secondary alcohol. Most preferred are primary alcohols or alcohol mixtures. More preferably, the alcohol or alcohol mixture is non-volatile and has a boiling point or range of at least 100° C., more preferably of at least 200° C.

In another preferred embodiment of the presently claimed invention, the at least one alcohol is used in an amount in the range from about 1 to about 70%, in embodiment 1 or embodiment 2.

In a more preferred embodiment of the presently claimed invention, the at least one alcohol is used in an amount in the range from about 10 to about 60%, in embodiment 1 or embodiment 2.

In an even more preferred embodiment of the presently claimed invention, the at least one alcohol is used in an amount in the range from about 30 to about 60%, in embodiment 1 or embodiment 2.

In a more preferred embodiment of the presently claimed invention, the at least one polyether alcohol of formula B—(O-A)$_n$-OH is methoxypolyethylene glycol having average molecular weight ($M_n$) in the range of ≥100 to ≤1000 g/mol, as determined according to DIN 55672-1, in embodiment 1 or embodiment 2.

In a more preferred embodiment of the presently claimed invention, the polyether alcohol is methoxypolyethylene glycol having average molecular weight ($M_n$) in the range of ≥200 to 800≤g/mol, as determined according to DIN 55672-1, in embodiment 1 or embodiment 2.

In an even more preferred embodiment of the presently claimed invention, the polyether alcohol is methoxypolyethylene glycol having average molecular weight ($M_n$) in the range of ≥300 to ≤700 g/mol, as determined according to DIN 55672-1, in embodiment 1 or embodiment 2.

In a most preferred embodiment of the presently claimed invention, the polyether alcohol is methoxypolyethylene glycol having average molecular weight ($M_n$) is about 500 g/mol, as determined according to DIN 55672-1, in embodiment 1 or embodiment 2.

In another preferred embodiment of the presently claimed invention, the at least one alcohol W is a polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{20}$ alkyl, substituted or unsubstituted $C_1$-$C_{20}$ alkylaryl, and substituted or unsubstituted $C_1$-$C_{20}$ dialkylaryl and n is an integer in the range of ≥1 to ≤120, in embodiment 1 or embodiment 2.

In yet another preferred embodiment of the presently claimed invention, the at least one alcohol W is a polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{15}$ alkyl, substituted or unsubstituted $C_1$-$C_{15}$ alkylaryl, and substituted or unsubstituted $C_1$-$C_{15}$ dialkylaryl and n is an integer in the range of ≥1 to ≤100, in embodiment 1 or embodiment 2.

In a more preferred embodiment of the presently claimed invention, the at least one alcohol W is a polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{10}$ alkyl, substituted or unsubstituted $C_1$-$C_{10}$ alkylaryl, and substituted or unsubstituted $C_1$-$C_{10}$ dialkylaryl and n is an integer in the range of ≥1 to ≤80, in embodiment 1 or embodiment 2.

In an even more preferred embodiment of the presently claimed invention, the at least one alcohol W is a polyether alcohol of formula B—(O-A)$_n$-OH, wherein A is a substituted or unsubstituted, linear or branched $C_2$-$C_3$ alkylene and B is selected from the group consisting of substituted or unsubstituted, linear or branched $C_1$-$C_4$ alkyl and n is an integer in the range of ≥1 to ≤50, in embodiment 1 or embodiment 2.

In another more preferred embodiment of the presently claimed invention, the at least one alcohol W is a polyether alcohol of formula B—(O-A)$_n$-OH, wherein A is ethylene or propylene and B is selected from the group consisting of substituted or unsubstituted, linear or branched $C_1$-$C_4$ alkyl and n is an integer in the range of ≥1 to ≤50, in embodiment 1 or embodiment 2.

In a preferred embodiment of the presently claimed invention, the at least one alcohol is an unsubstituted linear or branched $C_8$-$C_{36}$ alkyl mono alcohol, in embodiment 1 or embodiment 2.

In a more preferred embodiment of the presently claimed invention, the at least one alcohol is an unsubstituted linear or branched $C_{10}$-$C_{25}$ alkyl mono alcohol, in embodiment 1 or embodiment 2.

In an even more preferred embodiment of the presently claimed invention, the at least one alcohol is an unsubstituted linear or branched $C_{12}$-$C_{22}$ alkyl mono alcohol, in embodiment 1 or embodiment 2.

In a preferred embodiment of the presently claimed invention, the compound $R^1$—OH is selected from the group consisting of nonan-1-ol, nonan-2-ol, dodecan-1-ol, decan-1-ol, and decan-2-ol.

In a preferred embodiment of the presently claimed invention, the at least one alcohol is a compound $R^1$—OH, wherein $R^1$ is a substituted or unsubstituted, linear or branched $C_{15}$-$C_{40}$ alkyl.

In a preferred embodiment of the presently claimed invention, the at least one alcohol is a compound $R^1$—OH, wherein $R^1$ is a substituted or unsubstituted, linear or branched $C_{10}$-$C_{34}$ alkyl.

In a preferred embodiment of the presently claimed invention, the at least one alcohol is a compound $R^1$—OH, wherein $R^1$ is a substituted or unsubstituted, linear or branched $C_{12}$-$C_{30}$ alkyl.

In a preferred embodiment of the presently claimed invention, the at least one alcohol is a compound $R^1$—OH, wherein $R^1$ is a substituted or unsubstituted, linear or branched $C_{10}$-$C_{28}$ alkyl.

In a preferred embodiment of the presently claimed invention, the at least one alcohol is a compound $R^1$—OH, wherein $R^1$ is a substituted or unsubstituted, linear or branched $C_8$-$C_{25}$ alkyl.

The term "transamidization" refers to a reaction involving the aminolysis of polyacrylate, wherein an acrylate ester is reacted with at least one amine $NH_2$—$R^{11}$—$NR^{12}R^{13}$ (Z1) or $NH_2$—$R^{11}$—Y (Z2) as described herein, to yield the corresponding amide. Preferably the alcohol radical to be replaced is methanol, ethanol, propanol or butanol. Typically, the reaction is carried out at elevated temperatures, typically 70-180° C., by reacting the CFRP polymer with the corresponding amine in the absence or presence of well-known catalysts, such as tetra-isopropyltitanate, tetrabutyltitanate, alkali- or earth alkali alcoholates like NaOMe or LiOMe. Typically, the low boiling product alcohol is removed from the reaction mixture by distillation to shift the reaction equilibrium. If needed, catalyst residues may be removed by adsorption or extraction or otherwise processed or inactivated by known methods, like hydrolysis with water or acids. The choice of the replacing amine is important as the replacing amine controls the properties of the resulting copolymer. Also, the reacting carboxyl groups in the acrylic acid are noted to self-catalyze the reaction, therefore the presence of catalysts is optional for the reaction.

In a preferred embodiment of the presently claimed invention, the at least one amine is used in an amount in the range from about 1 to about 50%, in embodiment 1 or embodiment 2.

In an even more preferred embodiment of the presently claimed invention, the at least one amine is used in an amount in the range from about 5 to about 40%, in embodiment 1 or embodiment 2.

In a more preferred embodiment of the presently claimed invention, the at least one amine is used in an amount in the range from about 10 to about 30%, in embodiment 1 or embodiment 2.

In another preferred embodiment of the presently claimed invention, the $R^{11}$ is unsubstituted, linear or branched $C_1$-$C_8$ alkylene, in embodiment 1 or embodiment 2.

In a more preferred embodiment of the presently claimed invention, the $R^{11}$ is unsubstituted, linear or branched $C_1$-$C_7$ alkylene, in embodiment 1 or embodiment 2.

In an even more preferred embodiment of the presently claimed invention, the $R^{11}$ is unsubstituted, linear or branched $C_1$-$C_6$ alkylene, in embodiment 1 or embodiment 2.

In another preferred embodiment of the presently claimed invention, the $R^{11}$ is selected from the group consisting of $—CH_2—$, $—CH_2CH_2—$, $—CH_2CH_2CH_2—$ and $—CH_2CH_2CH_2CH_2—$, in embodiment 1 or embodiment 2.

In a preferred embodiment of the presently claimed invention, $R^{11}$ is unsubstituted, linear or branched $C_1$-$C_8$ alkylene; and $R^{12}$ and $R^{13}$ are unsubstituted, linear or branched $C_1$-$C_8$ alkyl, in embodiment 1 or embodiment 2.

In a more preferred embodiment of the presently claimed invention, $R^{11}$ is unsubstituted, linear or branched $C_1$-$C_6$ alkylene; and $R^{12}$ and $R^{13}$ are unsubstituted, linear or branched $C_1$-$C_6$ alkyl, in embodiment 1 or embodiment 2.

In a preferred embodiment of the presently claimed invention, the $R^{12}$ and $R^{13}$ are independently selected from hydrogen and substituted or unsubstituted, linear or branched $C_1$-$C_8$ alkyl which can be the same or different, in embodiment 1 or embodiment 2.

In a more preferred embodiment of the presently claimed invention, the $R^{12}$ and $R^{13}$ are independently selected from the group consisting of methyl, ethyl, propyl and isopropyl.

In a more preferred embodiment of the presently claimed invention, the $R^{12}$ and $R^{13}$ are unsubstituted, linear or branched $C_1$-$C_8$ alkyl together with the nitrogen atom to which they are attached form an unsubstituted or substituted 3- to 6-membered ring comprising 1 or 2 heteroatom(s) selected from nitrogen and oxygen.

In yet another preferred embodiment of the presently claimed invention, $R^{12}$ and $R^{13}$ together with the nitrogen atom to which they are attached form a 6-membered ring comprising 1 to 2 heteroatoms, in embodiment 1 or embodiment 2.

In a more preferred embodiment of the presently claimed invention, the $R^{12}$ and $R^{13}$ together with the nitrogen atom to which they are attached form pyrrolidinyl, piperidinyl or morpholinyl In another more preferred embodiment of the presently claimed invention, the Y is a 5- or 6-membered N-containing heterocycle which comprises 1 or 2 nitrogen atoms.

In another more preferred embodiment of the presently claimed invention, the Y is selected from the group consisting of imidazolyl and pyridinyl.

In another preferred embodiment of the presently claimed invention, the at least one amine is a aliphatic diamine selected from the group consisting of 2-(diethylamino)ethylamine, 3-(dimethylamino)propylamine, 3-(diethylamino) propylamine or 1-diethylamino-4-aminopentane, in embodiment 1 or embodiment 2.

In another preferred embodiment of the presently claimed invention, the at least one amine is a heterocyclic amine selected from the group consisting of N-(3-aminopropyl) imidazole, N-(3-aminopropyl)morpholine or N-(2-aminoethyl)-piperidine, in embodiment 1 or embodiment 2.

In another preferred embodiment of the presently claimed invention, the at least one amine is a saturated or unsaturated aliphatic amine comprising 6-22 carbon atoms, in embodiment 1 or embodiment 2.

In a more preferred embodiment of the presently claimed invention, the at least one amine is a saturated or unsaturated aliphatic amine selected from 2-ethylhexylamine, oleylamine or stearylamine, in embodiment 1 or embodiment 2.

In yet another preferred embodiment of the presently claimed invention, the at least one amine is an alicyclic amine comprising 2-6 carbon atoms, in embodiment 1 or embodiment 2.

In a more preferred embodiment of the presently claimed invention, the at least one amine is selected from the group consisting of 3-(dimethylamino)1-propylamine, 1-(3-aminopropyl)imidazole, 4-(aminomethyl)pyridine, 1-(2-aminoethyl)piperidine, 3-morpholinopropylamine, and combinations thereof, in embodiment 1 or embodiment 2.

In an alternative preferred embodiment of the presently claimed invention, the mixture M1 further comprises at least one ethylenically unsaturated monomer to obtain a polyacrylate P1, which is then reacted with the mixture M2 in step ii), in embodiment 1 or embodiment 2.

In a more preferred embodiment of the presently claimed invention, the polyacrylate P1 is a random copolymer, in embodiment 1 or embodiment 2.

In a more preferred embodiment of the presently claimed invention, the polyacrylate P1 is a block copolymer, in embodiment 1 or embodiment 2.

In an alternative preferred embodiment of the presently claimed invention, the mixture M2 further comprises at least one ethylenically unsaturated monomer to obtain a polyacrylate P2, which is then reacted with the mixture M2 in step ii), in embodiment 1 or embodiment 2.

In a more preferred embodiment of the presently claimed invention, polyacrylate P1 is further reacted with at least one ethylenically unsaturated monomer to obtain a polyacrylate P2, which is then reacted with the mixture M2 in step ii), in embodiment 1 or embodiment 2.

In a more preferred embodiment of the presently claimed invention, the polyacrylate P2 is a gradient block copolymer, in embodiment 1 or embodiment 2.

In a more preferred embodiment of the presently claimed invention, the at least one ethylenically unsaturated monomer is selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds, in embodiment 1 or embodiment 2.

In an even more preferred embodiment of the presently claimed invention, the at least one ethylenically unsaturated monomer is selected from the group consisting of a $C_1$-$C_{18}$ vinylaromatic, an ethylenically unsaturated nitrile, acrylamide, a vinyl halide, a vinyl ether of an $C_2$-$C_8$ alcohol and an $C_4$-$C_6$ aliphatic hydrocarbon having one or two double bonds in embodiment 1 or embodiment 2.

In a further more preferred embodiment of the presently claimed invention, the at least one ethylenically unsaturated monomer is selected from the group consisting of a $C_9$-$C_{15}$ vinylaromatic, an ethylenically unsaturated nitrile, acrylamide, a vinyl halide, a vinyl ether of an $C_3$-$C_7$ alcohol and an $C_4$-$C_6$ aliphatic hydrocarbon having one or two double bonds, in embodiment 1 or embodiment 2.

The term "vinyl", as used herein, refers to one of the alkenyl functional groups, also referred to as ethenyl.

The term "aromatic", as used herein, refers to one of the unsaturated cyclic, planar molecules that possess a ring of resonance bonds. Examples of aromatic groups are, in particular, pyridyl, benzyl, phenyl, naphthyl, anthracenyl, phenanthrenyl, naphthacenyl, chrysenyl, pyrenyl, etc. Further, the aromatic molecule can preferably be interrupted by a heteroatom selected from oxygen or nitrogen. These are preferably selected from pyridyl, imidazolyl, bipyridyl, etc. Also, the aryls can be substituted, depending on the number and size of their ring systems, have one or more (e.g. 1, 2, 3, 4, 5 or more than 5) substituents. These are preferably selected independently from among alkyl, alkoxy, cycloalkyl, cycloalkyloxy, heterocycloalkyl, aryl, aryloxy, arylthio, hetaryl, halogen, hydroxy, SHYDROGEN, alkylthio, alkylsulfinyl, alkylsulfonyl, COOHYDROGEN, carboxylate, $SO_3$HYDROGEN, sulfonate, $NE^5E^6$, nitro and cyano, where $E^5$ and $E^6$ are each independently of one another, hydrogen, alkyl, cycloalkyl, cycloalkyloxy, polycyclyl, polycyclyloxy, heterocycloalkyl, aryl, aryloxy or hetaryl.

In a preferred embodiment of the presently claimed invention, the at least one ethylenically unsaturated monomer comprises at least a monomer without primary or secondary ester bond, in embodiment 1 or embodiment 2.

In a preferred embodiment of the presently claimed invention, the at least one ethylenically unsaturated monomer is selected from the group consisting of isoprene, 1,3-butadiene, α-C5-C18-alkene, 4-vinyl-pyridine or pyridinium-ion, 2-vinyl-pyridine or pyridinium-ion, vinyl-imidazole or imidazolinium ion, dimethylacrylamide, 3-dimethylaminopropylmethacrylamide, styrene, α-methyl styrene, p-methyl styrene, p-tert-butyl-styrene and a compound of formula CH2=C(Ra)—(C═Z)—Rb, wherein Ra is hydrogen or methyl, Rb is NH2, O-(Me+), unsubstituted C1-C18-alkoxy, C2-C100-alkoxy interrupted by at least one nitrogen and/or oxygen atom, or hydroxy-substituted C1-C18 alkoxy, unsubstitut-ed C1-C18 alkylamino, di(C1-C18 alkyl)-amino, hydroxy-substituted C1-C18 alkylamino or hy-droxy-substituted di(C1-C18 alkyl)amino, —O—CH2-CH2-N(CH3)2 or —O—CH2-CH 2-N+H (CH3)2 An−;

An− is an anion of a monovalent organic or inorganic acid;

Me is a monovalent metal atom or the ammonium ion; and

Z is oxygen or sulfur

In another preferred embodiment of the presently claimed invention, the $R_b$ is a $C_2$-$C_{100}$ alkoxy interrupted by at least one O atom having the formula

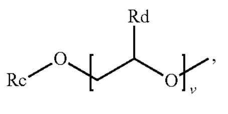

wherein Rc is $C_1$-$C_{25}$ alkyl, phenyl or phenyl substituted by $C_1$-$C_{18}$ alkyl, Rd is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide, mixtures of both, or hydrogen, in embodiment 1 or embodiment 2.

In another preferred embodiment of the presently claimed invention, the ethylenically unsaturated monomer is selected from a compound of formula $CH_2$═C($R_a$)—(C═Z)—$R_b$, wherein $R_a$ is hydrogen or methyl, $R_b$ is $NH_2$O-(Me+), unsubstituted $C_1$-$C_{18}$alkoxy, $C_2$-$C_{100}$ alkoxy interrupted by at least one N and/or O atom, or hydroxy-substituted $C_1$-$C_{18}$alkoxy, unsubstituted $C_1$-$C_{18}$ alkylamino, di($C_1$-$C_{18}$alkyl)-amino, hydroxy-substituted $C_1$-$C_{18}$ alkylamino or hydroxy-substituted di($C_1$-$C_{18}$ alkyl)amino, —O—$CH_2$—$CH_2$—N$(CH_3)_2$ or —O—$CH_2$—$CH_2$—$N^+H(CH_3)_2An^-$;

An− is an anion of a monovalent organic or inorganic acid;

Me is a monovalent metal atom or the ammonium ion; and

Z is oxygen or sulfur, in embodiment 1 or embodiment 2.

In yet another preferred embodiment of the presently claimed invention, the ethylenically unsaturated monomer is selected from a compound of formula $CH_2$═C($R_a$)—(C═Z)—$R_b$, wherein $R_a$ is hydrogen or methyl, $R_b$ is $NH_2$, O-(Me+), unsubstituted $C_1$-$C_{10}$ alkoxy, $C_2$-$C_{50}$ alkoxy interrupted by at least one N and/or O atom, or hydroxy-substituted $C_1$-$C_{10}$ alkoxy, unsubstituted $C_1$-$C_{18}$ alkylamino, di($C_1$-$C_{10}$ alkyl)-amino, hydroxy-substituted $C_1$-$C_{10}$ alkylamino or hydroxy-substituted di($C_1$-$C_{10}$ alkyl)amino, —O—$CH_2$—$CH_2$—N$(CH_3)_2$ or —O—$CH_2$—$CH_2$—N+H $(CH_3)_2An^-$;

An− is an anion of a monovalent organic or inorganic acid;

Me is a monovalent metal atom or the ammonium ion; and

Z is oxygen or sulfur, in embodiment 1 or embodiment 2.

In a preferred embodiment of the presently claimed invention, the at least one ethylenically unsaturated monomer is selected from the group consisting of 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene and p-tert.-butylstyrene.

In a more preferred embodiment of the presently claimed invention, the at least one ethylenically unsaturated monomer is selected from the group consisting of a $C_6$-$C_{15}$ vinylaromatic, preferably $C_6$-$C_{10}$ vinylaromatic, in embodiment 1 or embodiment 2.

In a more preferred embodiment of the presently claimed invention, the at least one ethylenically unsaturated monomer is selected from the group consisting of 4-vinyl-pyridine, vinyltoluene, α- and p-methylstyrene, α-butylstyrene, 4-n-butylstyrene, 4-n-decylstyrene, and styrene, in embodiment 1 or embodiment 2.

In an even more preferred embodiment of the presently claimed invention, the ethylenically unsaturated monomer is selected from the group consisting of 4-vinyl-pyridine or pyridinium-ion, 2-vinyl-pyridine or pyridinium-ion, and vinyl-imidazole or imidazolinium-ion, in embodiment 1 or embodiment 2.

In a most preferred embodiment of the presently claimed invention, the ethylenically unsaturated monomer is 4-vinyl-pyridine or pyridinium-ion, in embodiment 1 or embodiment 2.

In a most preferred embodiment of the presently claimed invention, the at least one ethylenically unsaturated monomer is 4-vinyl-pyridine, in embodiment 1 or embodiment 2.

In a preferred embodiment of the presently claimed invention, the at least one ethylenically unsaturated nitrile is selected from the group consisting of acrylonitrile and methacrylonitrile, in embodiment 1 or embodiment 2.

In a preferred embodiment of the presently claimed invention, the at least one vinyl ether is selected from the group consisting of vinyl methyl ether and vinyl isobutyl ether, in embodiment 1 or embodiment 2.

In a preferred embodiment of the presently claimed invention, the vinyl halide is selected from at least one ethylenically unsaturated compounds substituted by chlorine, fluorine or bromine, preferably vinyl chloride and vinylidene chloride, in embodiment 1 or embodiment 2.

In a preferred embodiment of the presently claimed invention, the at least one ethylenically unsaturated monomer is selected from the group consisting of $C_2$-$C_8$ aliphatic hydrocarbon, preferably $C_3$-$C_7$ aliphatic hydrocarbon, in embodiment 1 or embodiment 2.

The term "$C_2$-$C_8$ aliphatic hydrocarbon" refers to the hydrocarbons having 2 to 8 carbon atoms and one or two olefinic double bonds. In a most preferred embodiment of the presently claimed invention, the $C_2$-$C_8$ aliphatic hydrocarbon is selected from the group consisting of butadiene, isoprene, chloroprene, ethylene and propylene, in embodiment 1 or embodiment 2.

In a preferred embodiment of the presently claimed invention, the at least one ethylenically unsaturated monomer is selected from the group consisting of vinyl ether of a $C_1$-$C_{10}$ aliphatic hydrocarbon, preferably vinyl ether of a $C_2$-$C_8$ aliphatic hydrocarbon, in embodiment 1 or embodiment 2.

In another preferred embodiment of the presently claimed invention, the ethylenically unsaturated monomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acid-anhydrides, (alkyl)acrylic acid salts, (alkyl)acrylic esters, (alkyl)acrylonitriles, (alkyl)acrylamides, vinyl halides or vinylidene halides, in embodiment 2.

In yet another preferred embodiment of the presently claimed invention, the ethylenically unsaturated monomer is styrene, substituted styrene, methylacrylate, ethylacrylate, butylacrylate, isobutylacrylate, tert. butylacrylate, hydroxyethylacrylate, hydroxypropylacrylate, dimethylaminoethylacrylate, methyl(meth)acrylate, ethyl-(meth)acrylate, butyl (meth)acrylate, hydroxyethyl(meth)acrylate, hydroxypropyl (meth)-acrylate, dimethylaminoethyl(meth)acrylate, acrylonitrile, methacrylonitrile, acrylamide, methacrylamide or dimethylaminopropyl-methacrylamide, in embodiment 1 or embodiment 2.

In another preferred embodiment of the presently claimed invention, the at least one acrylate monomer are for example styrene, $C_1$-$C_8$ alkylesters of acrylic or methacrylic acid, such as n-butylacrylate or methacrylate, acrylonitrile or methacrylonitrile, in particular styrene, acrylonitrile and n-butylacrylate, in embodiment 1 or embodiment 2.

In another preferred embodiment of the presently claimed invention, the particularly preferred at least one acrylate monomer are styrene/acrylonitrile, styrene/butylacrylate, styrene/methylmethacrylate and styrene/butylmethacrylate, in embodiment 1 or embodiment 2.

In a more preferred embodiment of the presently claimed invention, the polymer which is obtained by reacting i) at least one polyacrylate P1 which is obtained by controlled free radical polymerization of a mixture M1 comprising at least one acrylate monomer selected from the group consisting of C1-C6 alkyl esters of acrylic acid, C1-C6 alkyl esters of methacrylic acid, hydroxy C1-C6 alkyl esters of acrylic acid and hydroxy C1-C6 alkyl esters of methacrylic acid in the presence of either a1 or a2, wherein a1 is at least one nitroxylether of formula R21R22NOX (I) and a2 is at least one stable free nitroxyl radical of formula R21R22NO· (II);

R21 and R22 are independently selected from substituted or unsubstituted, linear or branched C1-C18 alkyl, wherein R21 and R22 together with the nitrogen atom to which they are attached form an unsubstituted or substituted 5- to 10-membered aliphatic ring comprising 1 to 3 heteroatom(s) selected from nitrogen and oxygen, and X is selected from the group consisting of —CH2-phenyl, —CH3CH-phenyl, —(CH3)2C-phenyl, —(C5-C6 cycloalkyl)2C—CN, —(CH3)2CCN, —CH2CH═CH2, —CH3CH—CH═CH2, —(C1-C4alkyl)CR20-C(O)-phenyl, —(C1-C4)alkyl-CR20-C(O)(C1-C4)alkoxy, —(C1-C4)alkyl-CR20-C(O)—(C1-C4)alkyl, —(C1-C4)alkyl-CR20-C(O)—N-di(C1-C4)alkyl, —(C1-C4)alkyl-CR20-C(O)—NH(C1-C4) alkyl, and —(C1-C4)alkyl-CR20-C(O)—NH2, wherein R20 is hydrogen or (C1-C4)alkyl;

reacting polyacrylate P1 with at least one ethylenically unsaturated monomer to obtain a polyacrylate P2, reacting P2 with ii) a mixture M2 comprising at least one alcohol W selected from the group consisting of W1 and W2 and at least one amine Z selected from the group consisting of Z1 and Z2;

wherein,

W1 is R1-OH, wherein R1 is a substituted or unsubstituted, linear or branched C8-C36 alkyl;

W2 is at least one polyether alcohol of formula B—(O-A)n-OH, wherein A is a substituted or unsubstituted, linear or branched C1-C4 alkylene and B is selected from the group consisting of substituted or unsubstituted, linear or branched C1-C22 alkyl, substituted or unsubstituted C1-C24 alkylaryl, and substituted or unsubstituted $C_1$-$C_{24}$ dialkylaryl and n is an integer in the range of ≥1 to ≤150;

Z1 is NH2-R11-NR12R13, and NH2-R11-Y, wherein R11 is a substituted or unsubstituted, linear or branched C1-C12 alkylene;

R12 and R13 are independently selected from the group consisting of hydrogen and substituted or unsubstituted, linear or branched C1-C12 alkyl, or R12 and R13 together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom.

In a more preferred embodiment of the presently claimed invention, the polymer which is obtained by reacting i) at least one polyacrylate P1 which is obtained by controlled free radical polymerization of a mixture M1 comprising at least one acrylate monomer selected from the group con-sisting of C1-C6 alkyl esters of acrylic acid, C1-C6 alkyl esters of methacrylic acid, hydroxy C1-C6 alkyl esters of acrylic acid and hydroxy C1-C6 alkyl esters of methacrylic acid in the presence of either a1 or a2, wherein a1 is at least one nitroxylether of formula R21R22NOX (I) and a2 is at least one stable free nitroxyl radical of formula R21R22NO· (II);

R21 and R22 are independently selected from substituted or unsubstituted, linear or branched C1-C18 alkyl, wherein R21 and R22 together with the nitrogen atom to which they are attached form an unsubstituted or substituted 5- to 10-membered aliphatic ring comprising 1 to 3 heteroatom(s) selected from nitrogen and oxygen, and X is selected from the group consisting of —CH2-phenyl, —CH3CH-phenyl, —(CH3)2C-phenyl, —(C5-C6 cycloalkyl)2C—CN, —(CH3)2CCN, —CH 2CH═CH2, —CH3CH—CH═CH2, —(C1-C4alkyl)CR20-C(O)-phenyl, —(C1-C4)alkyl-CR20-C(O)(C1-C4)alkoxy, —(C1-C4)alkyl-CR20-C(O)—(C1-C4)alkyl, —(C1-C4)alkyl-CR20-C(O)—N-di(C1-C4)alkyl, —(C1-C4)alkyl-CR20-C(O)—NH(C1-C4) alkyl, and —(C1-C4)alkyl-CR20-C(O)—NH2, wherein R20 is hydrogen or (C1-C4)alkyl;

reacting polyacrylate P1 with at least one ethylenically unsaturated monomer selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds, to obtain a polyacrylate P2, reacting P2 with ii) a mixture M2 comprising at least one alcohol W selected from the group consisting of W1 and W2 and at least one amine Z selected from the group consisting of Z1 and Z2;

wherein,

W1 is R1-OH, wherein R1 is a substituted or unsubstituted, linear or branched C8-C36 alkyl;

W2 is at least one polyether alcohol of formula B—(O-A)n-OH, wherein A is a substituted or unsubstituted, linear or branched C1-C4 alkylene and B is selected from the group consisting of substituted or unsubstituted, linear or branched C1-C22 alkyl, substituted or unsubstituted C1-C24 alkylaryl, and substituted or unsubstituted C1-C24 dialkylaryl and n is an integer in the range of ≥1 to ≤150;

Z1 is NH2-R11-NR12R13, and Z2 is NH2-R11-Y, wherein R11 is a substituted or unsubstituted, linear or branched C1-C12 alkylene;

R12 and R13 are independently selected from the group consisting of hydrogen and substituted or unsubstituted, linear or branched C1-C12 alkyl, or R12 and R13 together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom.

In a more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_2$-$C_5$ alkyl ester of acrylic acid, $C_2$-$C_5$ alkyl ester of methacrylic acid, hydroxy $C_2$-$C_5$ alkyl ester of acrylic acid and hydroxy $C_2$-$C_5$ alkyl ester of methacrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $—CH_2$-phenyl, $—CH_3CH$-phenyl, $—(CH_3)_2C$-phenyl, $—(C_5$-$C_6$ cycloalkyl$)_2C—CN$, $—(CH_3)_2CCN$, $—CH_2CH═CH_2$, $—CH_3CH—CH═CH_2$, $—(C_1$-$C_4$alkyl$)CR_{20}—C(O)$-phenyl, $—(C_1$-$C_4)$alkyl-$CR_{20}—C(O)—(C_1$-$C_4)$alkoxy, $—(C_1$-$C_4)$alkyl-$CR_{20}—C(O)—(C_1$-$C_4)$alkyl, $—(C_1$-$C_4)$alkyl-$CR_{20}—C(O)—N$-di$(C_1$-$C_4)$alkyl, $—(C_1$-$C_4)$alkyl-$CR_{20}—C(O)—NH(C_1$-$C_4)$ alkyl, and $—(C_1$-$C_4)$alkyl-$CR_{20}—C(O)—NH_2$, wherein $R_{20}$ is hydrogen or $(C_1$-$C_4)$alkyl, with ii) a mixture comprising at least one alcohol W selected from the group consisting of W1 and W2 and at least one amine Z selected from the group consisting of Z1 and Z2;

wherein,

W1 is $R^1—OH$, wherein $R^1$ is a substituted or unsubstituted linear or branched $C_{10}$-$C_{34}$ alkyl;

W2 is at least one polyether alcohol of formula $B—(O-A)_n$-OH, wherein A is a substituted or unsubstituted, linear or branched $C_1$-$C_4$ alkylene and B is selected from the group consisting of substituted or unsubstituted, linear or branched $C_1$-$C_{20}$ alkyl, substituted or unsubstituted $C_1$-$C_{20}$ alkylaryl, and substituted or unsubstituted $C_1$-$C_{20}$ dialkylaryl and n is an integer in the range of 7 to 48;

Z1 is $NH_2—R^{11}—NR^{12}R^{13}$, and Z2 is $NH_2—R^{11}—Y$, wherein $R^{11}$ is a substituted or unsubstituted, linear or branched $C_1$-$C_{10}$ alkylene;

$R^{12}$ and $R^{13}$ are independently selected from the group consisting of hydrogen and substituted or unsubstituted, linear or branched $C_1$-$C_{10}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms or which can additionally comprise an oxygen atom, in embodiment 1 or embodiment 2.

In another more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_2$-$C_5$ alkyl ester of acrylic acid, $C_2$-$C_5$ alkyl ester of methacrylic acid, hydroxy $C_2$-$C_5$ alkyl ester of acrylic acid and hydroxy $C_2$-$C_5$ alkyl ester of methacrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $—CH_2$- phenyl, —$CH_3CH$-phenyl, —$(CH_3)_2C$-phenyl, —($C_5$-$C_6$ cycloalkyl)$_2$C—CN, —$(CH_3)_2CCN$, —$CH_2CH$═$CH_2$, —$CH_3CH$—CH═$CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{29}$—C(O)—($C_1$-$C_4$)alkyl, —($C_1$-$C_4$)alkyl-$CR_{29}$—C(O)—N-di($C_1$-$C_4$)alkyl, —($C_1$-$C_4$)alkyl-$CR_{29}$—C(O)—NH($C_1$-$C_4$) alkyl, and —($C_1$-$C_4$)alkyl-$CR_{20}$—C(O)—$NH_2$, wherein $R_{20}$ is hydrogen or ($C_1$-$C_4$)alkyl, reacting polyacrylate P1 with at least one ethylenically unsaturated monomer selected from the group consisting of a $C_6$-$C_{10}$ vinylaromatic, an ethylenically unsaturated nitrile, acrylamide, a vinyl halide, a vinyl ether of an $C_2$-$C_9$ alcohol and an $C_3$-$C_7$ aliphatic hydrocarbon having one or two double bonds, to obtain a polyacrylate P2, reacting P2 with ii) a mixture comprising at least one alcohol W selected from the group consisting of W1 and W2 and at least one amine Z selected from the group consisting of Z1 and Z2;

wherein,

W1 is $R^1$—OH, wherein $R^1$ is a substituted or unsubstituted linear or branched $C_{10}$-$C_{34}$ alkyl;

W2 is at least one polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{20}$ alkyl, substituted or unsubstituted $C_1$-$C_{20}$ alkylaryl, and substituted or unsubstituted $C_1$-$C_{29}$ dialkylaryl and n is an integer in the range of 7 to 48;

Z1 is $NH_2$—$R^{11}$—$NR^{12}R^{13}$, and Z2 is $NH_2$—$R^{11}$—Y, wherein $R^{11}$ is a substituted or unsubstituted, linear or branched $C_1$-$C_{10}$ alkylene;

$R^{12}$ and $R^{13}$ are independently selected from the group consisting of hydrogen and substituted or unsubstituted, linear or branched $C_1$-$C_{10}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom, in embodiment 1 or embodiment 2.

In an even more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_1$-$C_6$ alkyl ester of acrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —($C_5$-$C_6$ cycloalkyl)$_2$C—CN, —$(CH_3)_2CCN$, —$CH_2CH$═$CH_2$, —$CH_3CH$—CH═$CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$) alkyl, and —($C_1$-$C_4$)alkyl-$CR_{20}$—C(O)—$NH_2$, wherein $R_{20}$ is hydrogen or ($C_1$-$C_4$)alkyl, with ii) a mixture comprising at least one alcohol W selected from W2 and at least one amine Z selected from Z1;

wherein,

W2 is a polyether alcohol of formula B—(O-A)$_n$-OH, wherein A is ethylene or propylene and B is selected from the group consisting of substituted or unsubstituted, linear or branched $C_1$-$C_4$ alkyl and n is an integer in the range of ≥1 to ≤50;

Z1 is $NH_2$—$R^{11}$—$NR^{12}R^{13}$, wherein $R^{11}$ is a substituted or unsubstituted, linear or branched $C_1$-$C_{12}$ alkylene;

$R^{12}$ and $R^{13}$ are independently selected from hydrogen and substituted or unsubstituted, linear or branched $C_2$-$C_{10}$ alkyl which can be the same or different, or $R^{12}$ and $R^{13}$ together with the nitrogen atom to which they are attached form a 3- to 12-membered ring comprising 1 to 3 heteroatom(s) selected from nitrogen and oxygen, and Y is a 5- or 6-membered N-containing heterocycle which comprises 1 or 2 nitrogen atoms and 0 or 1 oxygen atom, in embodiment 1 or embodiment 2.

In another even more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_1$-$C_6$ alkyl ester of acrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —($C_5$-$C_6$ cycloalkyl)$_2$C—CN, —$(CH_3)_2CCN$, —$CH_2CH$═$CH_2$, —$CH_3CH$—CH═$CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$) alkyl, and —($C_1$-$C_4$)alkyl-$CR_{20}$—C(O)—$NH_2$, wherein $R_{20}$ is hydrogen or ($C_1$-$C_4$)alkyl, reacting polyacrylate P1 with at least one ethylenically unsaturated monomer selected from the group consisting of a $C_5$-$C_{20}$ vinylaromatic, to obtain a polyacrylate P2, reacting P2 with ii) a mixture comprising at least one alcohol W selected from W2 and at least one amine Z selected from Z1;

wherein,

W2 is a polyether alcohol of formula B—(O-A)$_n$-OH, wherein A is ethylene or propylene and B is selected from the group consisting of substituted or unsubstituted, linear or branched $C_1$-$C_4$ alkyl and n is an integer in the range of ≥1 to ≤50;

Z1 is NH2-$R^{11}$—$NR^{12}R^{13}$, wherein $R^{11}$ is a substituted or unsubstituted, linear or branched $C_1$-$C_{12}$ alkylene;

$R^{12}$ and $R^{13}$ are independently selected from hydrogen and substituted or unsubstituted, linear or branched $C_2$-$C_{10}$ alkyl which can be the same or different, or $R^{12}$ and $R^{13}$ together with the nitrogen atom to which they are attached form a 3- to 12-membered ring comprising 1 to 3 heteroatom(s) selected from nitrogen and oxygen, and Y is a 5- or 6-membered N-containing heterocycle which comprises 1 or 2 nitrogen atoms and 0 or 1 oxygen atom, in embodiment 1 or embodiment 2.

In another more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_2$-$C_5$ alkyl ester of acrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{15}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —$(C_5$-$C_6$ cycloalkyl$)_2C$—CN, —$(CH_3)_2CCN$, —$CH_2CH{=}CH_2$, —$CH_3CH$—$CH{=}CH_2$, —$(C_1$-$C_4$alkyl$)CR_{20}$—C(O)-phenyl, —$(C_1$-$C_4)$alkyl-$CR_{20}$—C(O)—$(C_1$-$C_4)$alkoxy, —$(C_1$-$C_4)$alkyl-$CR_{20}$—C(O)—$(C_1$-$C_4)$alkyl, —$(C_1$-$C_4)$alkyl-$CR_{20}$—C(O)—N-di$(C_1$-$C_4)$alkyl, —$(C_1$-$C_4)$alkyl-$CR_{20}$—C(O)—NH$(C_1$-$C_4)$ alkyl, and —$(C_1$-$C_4)$alkyl-$CR_{20}$—C(O)—$NH_2$, wherein $R_{20}$ is hydrogen or $(C_1$-$C_4)$alkyl, with ii) a mixture comprising at least one alcohol W selected from W2 and at least one amine Z selected from Z1;

wherein,

W2 is a polyether alcohol of formula B—$(O\text{-}A)_n$-OH, wherein A is ethylene or propylene and B is selected from the group consisting of substituted or unsubstituted, linear or branched $C_1$-$C_4$ alkyl and n is an integer in the range of ≥1 to ≤50;

Z1 is $NH_2$—$R^{11}$—$NR^{12}R^{13}$, wherein $R^{11}$ is a substituted or unsubstituted, linear or branched $C_1$-$C_{10}$ alkylene;

$R^{12}$ and $R^{13}$ are independently selected from hydrogen and substituted or unsubstituted, linear or branched $C_2$-$C_{10}$ alkyl which can be the same or different, or $R^{12}$ and $R^{13}$ together with the nitrogen atom to which they are attached form a 4- to 10-membered ring comprising 1 to 3 heteroatom(s) selected from nitrogen and oxygen, and Y is a 5- or 6-membered N-containing heterocycle which comprises 1 or 2 nitrogen atoms, in embodiment 1 or embodiment 2.

In another more preferred embodiment of the presently claimed invention, the polymer is obtained by reacting i) at least one polyacrylate P1 which is obtained by controlled free radical polymerization of a mixture M1 comprising at least one acrylate monomer selected from the group consisting of $C_2$-$C_5$ alkyl ester of acrylic acid, in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_1$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —$(C_5$-$C_6$ cycloalkyl$)_2C$—CN, —$(CH_3)_2CCN$, —$CH_2CH{=}CH_2$, —$CH_3CH$—$CH{=}CH_2$, —$(C_1$-$C_4$alkyl$)CR_{20}$—C(O)-phenyl, —$(C_1$-$C_4)$alkyl-$CR_{20}$—C(O)—$(C_1$-$C_4)$alkoxy, —$(C_1$-$C_4)$alkyl-$CR_{20}$—C(O)—$(C_1$-$C_4)$alkyl, —$(C_1$-$C_4)$alkyl-$CR_{20}$—C(O)—N-di$(C_1$-$C_4)$alkyl, —$(C_1$-$C_4)$alkyl-$CR_{20}$—C(O)—NH$(C_1$-$C_4)$ alkyl, and —$(C_1$-$C_4)$alkyl-$CR_{20}$—C(O)—$NH_2$, wherein $R_{20}$ is hydrogen or $(C_1$-$C_4)$alkyl, reacting polyacrylate P1 with at least one ethylenically unsaturated monomer selected from the group consisting of a $C_6$-$C_{10}$ vinylaromatic, to obtain a polyacrylate P2, reacting P2 with ii) a mixture comprising at least one alcohol W selected from W2 and at least one amine Z selected from Z1;

wherein,

W2 is a polyether alcohol of formula B—$(O\text{-}A)_n$-OH, wherein A is ethylene or propylene and B is selected from the group consisting of substituted or unsubstituted, linear or branched $C_1$-$C_4$ alkyl and n is an integer in the range of ≥1 to ≤50;

Z1 is $NH_2$—$R^{11}$—$NR^{12}R^{13}$, wherein $R^{11}$ is a substituted or unsubstituted, linear or branched $C_1$-$C_{10}$ alkylene;

$R^{12}$ and $R^{13}$ are independently selected from hydrogen and substituted or unsubstituted, linear or branched $C_2$-$C_{10}$ alkyl which can be the same or different, or $R^{12}$ and $R^{13}$ together with the nitrogen atom to which they are attached form a 4- to 10-membered ring comprising 1 to 3 heteroatom(s) selected from nitrogen and oxygen, and Y is a 5- or 6-membered N-containing heterocycle which comprises 1 or 2 nitrogen atoms, in embodiment 1 or embodiment 2.

In a preferred embodiment of the presently claimed invention, the controlled free radical polymerization is carried out in the presence of the at least one acrylate monomer and at least one ethylenically unsaturated monomer, in embodiment 1 or embodiment 2.

In a preferred embodiment of the presently claimed invention, the polymer has a polydispersity index of 1.0 to 2.2, more preferably from 1.1 to 1.9 and most preferably from 1.1 to 1.5, in embodiment 1 or embodiment 2.

In a preferred embodiment of the presently claimed invention, the polymer has an amine number in the range of from about ≥10 to ≤200 mg KOH/g, preferably from ≥50 to ≤150 mg KOH/g, more preferably from ≥80 to ≤120 mg KOH/g, as determined according to DIN 53176:2002-11, in embodiment 1 or embodiment 2.

In a preferred embodiment of the presently claimed invention, the at least one alcohol W to the at least one amine Z weight ratio is in the range of from about 0.1:1 to 10:1, preferably in the range of from about 0.2:1 to 8:1, more preferably in the range of from about 0.5:1 to 6:1, even more preferably in the range of from about 1:1 to 5:1, in embodiment 1 or embodiment 2.

In a preferred embodiment of the presently claimed invention, the process of embodiment 2, further comprises heating the mixture M1 of step a. carried out at a temperature in the range of from about 70-200° C., preferably of from about 80-190° C., more preferably of from about 90-180° C., even more preferably of from about 110-160° C., more preferably of from about 110-150° C.

In a preferred embodiment of the presently claimed invention, the at least one acrylate monomer to a1 or a2 mol ratio is in the range of from about 1:1 to 70:1, preferably in the range of from about 10:1 to 60:1, more preferably in the range of from about 20:1 to 50:1, in embodiment 2.

In a preferred embodiment of the presently claimed invention, the first polymerization step is carried out in the presence of a1, i.e., at least one nitroxylether of formula $R^{21}R^{22}NOX$ (I), in embodiment 2.

In another preferred embodiment of the presently claimed invention, the first polymerization step is carried out in the presence of a2, i.e., at least one stable free nitroxyl radical of formula $R_{21}R_{22}NO\cdot$ (II), in embodiment 2.

In a preferred embodiment of the presently claimed invention, the transesterification preferably comprises the removal of the $C_1$-$C_6$ alcohol byproduct by distillation, in embodiment 2.

In a preferred embodiment of the presently claimed invention, the at least one acrylate monomer is selected from $C_1$-$C_6$ alkyl or hydroxyalkyl ester of acrylic or methacrylic acid, in embodiment 2.

In a preferred embodiment of the presently claimed invention, the polyacrylate P1 of step a. is further reacted with at least one ethylenically unsaturated monomer, which is then modified in step b, in embodiment 2.

In a preferred embodiment of the presently claimed invention, the mixture M1 of step a. further comprises at least one ethylenically unsaturated monomer, which is then modified in step b, in embodiment 2.

In a preferred embodiment of the presently claimed invention, the at least one acrylate monomer is selected from

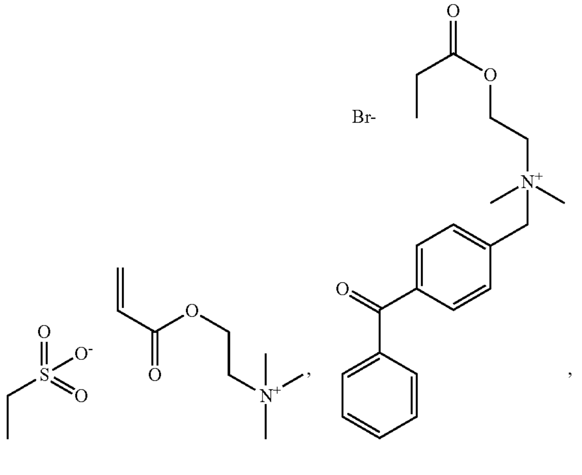

-continued

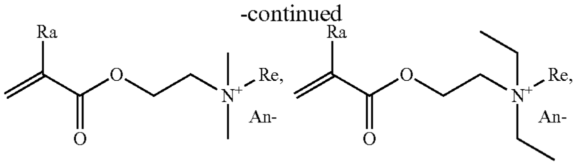

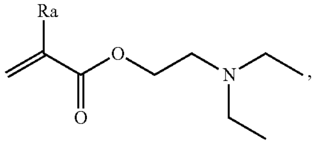

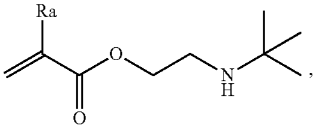

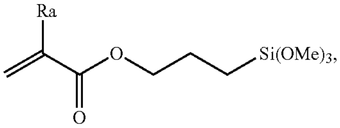

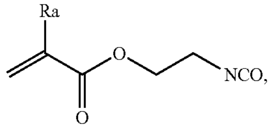

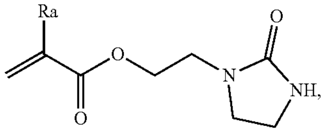

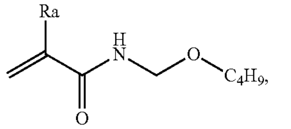 or 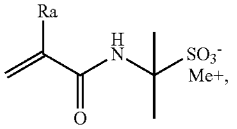

wherein $An^-$ and $R_a$ have the meaning as defined above and $R_e$ is methyl, benzyl or benzoylbenzyl, $An^-$ is preferably $Cl^-$, $Br^-$ or $—O_3S—O—CH_3$, and $Me^+$ is an alkali metal cation or the ammonium cation, in embodiment 2.

In another preferred embodiment of the presently claimed invention, the at least one acrylate monomer is also silicone functional (meth)acrylates, in embodiment 2.

In a preferred embodiment of the presently claimed invention, the polyacrylate P1 of step a. in embodiment 2, is further reacted with at least one ethylenically unsaturated monomer, which is then modified in step b.

In a preferred embodiment of the presently claimed invention, at least one ethylenically unsaturated monomer is selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds, in embodiment 2.

In a preferred embodiment of the presently claimed invention, the monomer in step a) of embodiment 2, can be selected from isoprene, 1,3-butadiene, α-$C_5$-$C_{18}$ alkene, 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene, p-tert-butyl-styrene or a compound of formula $CH_2{=}C(Ra)—(C{=}Z)—Rb$, wherein Ra is hydrogen or $C_1$-$C_4$alkyl, Rb is $NH_2$, $O^-(Me^+)$, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl) amino, —O—$CH_2$—$CH_2$—N$(CH_3)_2$ or —O—$CH_2$—$CH_2$—N+H$(CH_3)_2$$An^-$;

$An^-$ is an anion of a monovalent organic or inorganic acid;

Me is a monovalent metal atom or the ammonium ion.

Z is oxygen or sulfur, in embodiment 2.

In another preferred embodiment of the presently claimed invention, the step a of the process of embodiment 2, is carried out twice and a block copolymer is obtained wherein in the first or second radical polymerization step the monomer or monomer mixture contains 50 to 100% by weight, based on total monomers, of a $C_1$-$C_6$ alkyl or hydroxyalkyl ester of acrylic or methacrylic acid and in the second or first radical polymerization step respectively, the ethylenically unsaturated monomer contains no primary or secondary ester bond.

In another preferred embodiment of the presently claimed invention, when a block polymer is prepared by the process of embodiment 2, a block copolymer is prepared it is preferred that in the first polymerization step the monomer or monomer mixture contains from 50 to 100% by weight based on total monomers of a $C_1$-$C_6$ alkyl or hydroxyalkyl ester of acrylic or methacrylic acid and in the second polymerization step the ethylenically unsaturated monomer is 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene or p-tert-butyl-styrene.

In another preferred embodiment of the presently claimed invention, the block polymer prepared by the process of embodiment 2, is a gradient block polymer.

In another preferred embodiment of the presently claimed invention, the polymer prepared by the process of embodiment 2, is prepared by controlled free radical polymerization (CFRP). Solomon et al. in U.S. Pat. No. 4,581,429 have described similar processes using stable free nitroxyl radicals as controlling agents. These are the steps defined under a1) and a2) herein. Free radical polymerization process by controlled or “living” growth of polymer chains, which produces defined oligomeric homopolymers and copolymers, including block and graft copolymers. Disclosed is the use of initiators of the partial formula R'R"N—O—X. In the polymerization process the free radical species R'R"N—O· and ·X are generated. Herein, ·X is a free radical group, e.g. a tert.-butyl or cyanoisopropyl radical, capable of polymerizing monomer units containing ethylene groups.

In another preferred embodiment of the presently claimed invention, the polymer prepared by the process of embodiment 2, involves a1, wherein the nitroxylether according to the structures outlined above splits between the O—X bond. The regulating fragment in formula (I) corresponds to the O—N fragment and the initiating fragment (In) corresponds to the C centred radical of the group X.

In another preferred embodiment of the presently claimed invention, the polymer prepared by the process of embodiment 2, involves a2, wherein the free radical initiator is preferably an azo compound, a peroxide, perester or a hydroperoxide.

In a more preferred embodiment of the presently claimed invention, the polymer prepared by the process of embodiment 2, involves a2, wherein preferred radical sources is selected from the group consisting of 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methyl propane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoylperoxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butylperacetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide, and t-butyl hydroperoxide.

In another preferred embodiment of the presently claimed invention, the radical source is preferably present in an amount of from 0.01 mol-% to 30 mol-%, more preferred in an amount of from 0.1 mol-% to 20 mol-% and most preferred in an amount of from 0.5 mol-% to 10 mol-% based on the monomer or monomer mixture, in embodiment 2.

In another preferred embodiment of the presently claimed invention, the at least one alcohol (W) and at least one amine (Z) are added together, in embodiment 2.

In yet another preferred embodiment of the presently claimed invention, the transesterification and transamidization are carried out simultaneously, in embodiment 2.

In another preferred embodiment of the presently claimed invention, modifying the polyacrylate obtained in step b. is carried out in a step-wise manner, in embodiment 2.

In yet another preferred embodiment of the presently claimed invention, the step b. involves modifying the polyacrylate obtained in step a. by transesterification using at least one alcohol (W) selected from the group consisting of W1 and W2, followed by transamidization using at least one amine (Z) selected from the group consisting of Z1 and Z2, in embodiment 2.

In another preferred embodiment of the presently claimed invention, the step b. involves modifying the polyacrylate obtained in step a. by transamidization using at least one amine (Z) selected from the group consisting of Z1 and Z2 followed by transesterification using at least one alcohol (W) selected from the group consisting of W1 and W2, in embodiment 2.

In another preferred embodiment of the presently claimed invention, the molar ratio of the radical source to the nitroxyl radical may be from 1:10 to 10:1, preferably from 1:5 to 5:1 and more preferably from 1:2 to 2:1, in embodiment 2.

In another preferred embodiment of the presently claimed invention, the polymer or copolymer can also be prepared in a controlled way by atom transfer radical polymerization (ATRP), in embodiment 1 or embodiment 2. This type of polymerization is, for example, described in WO 96/30421.

In another preferred embodiment of the presently claimed invention, the polymer or copolymer has preferably a polydispersity index of 1.0 to 2.2, more preferably from 1.1 to 1.9 and most preferably from 1.1 to 1.5, in embodiment 1 or embodiment 2.

In a more preferred embodiment of the presently claimed invention, the initiator compound is present in an amount of from 0.01 mol-% to 30 mol-%, more preferably in an amount of from 0.1 mol-% to 20 mol-% and most preferred in an amount of from 0.1 mol-% to 10 mol-% based on the monomer or monomer mixture, in embodiment 2. When monomer mixtures are used, mol % is calculated on the average molecular weight of the mixture.

Yet another aspect of the claimed invention is a coating composition comprising the polymer of embodiment 1, as obtained by the process of embodiment 2.

In a preferred embodiment of the presently claimed invention, the coating composition is selected from the group consisting of ink, paint, or pigment compositions.

Yet another aspect of the claimed invention is an ink composition comprising the polymer of embodiment 1, as obtained by the process of embodiment 2.

In a preferred embodiment of the presently claimed invention, the ink or coating composition further comprises a particulate solid material selected from the group consisting of pigments, fillers, liquid diluent, and combinations thereof.

In a preferred embodiment of the presently claimed invention, the ink or coating composition has a viscosity in the range of from about ≥200 to ≤4000 mPa·s, preferably in the range from ≥350 to ≤3500 mPas, more preferably in the range from ≥450 to ≤3000 mPa·s, determined according to DIN 53019-1:2008-09.

In a preferred embodiment of the presently claimed invention, the ink or coating composition has a jetness in the range from 150 to 500, preferably in the range from 200 to 450, preferably in the range from 220 to 420, even more preferably in the range from 250 to 400, as determined according to DIN 55979.

In a preferred embodiment of the presently claimed invention, the polymer has a weight percentage in the range of from about 1 to 10%, preferably in the range of from about 2 to 9%, more preferably in the range of from about 3 to 8%, even more preferably in the range of from about 4 to 8%, based on the ink or coating composition.

In a preferred embodiment of the presently claimed invention, the polymer to the pigment weight ratio is in the range of from about 0.1:1 to 1.5:1, preferably in the range of from about 0.3:1 to 1.3:1, more preferably in the range of from about 0.6:1 to 1.2:1, even more preferably in the range of from about 0.7:1 to 1.1:1.

Yet another aspect of the presently claimed invention is the use of the polymer according to embodiment 1 as a dispersant in coating composition or an ink composition.

The presently claimed invention offers one or more of the following advantages:

1) The polymer of the presently claimed invention is capable of being used as part of an ink or coating compositions as a dispersant.
2) The polymer of the presently claimed invention does not interfere with the native properties of the dye/pigments, thereby ensuring high jetness.
3) The polymer of the presently claimed invention, when used as a dispersant, ensures a low viscosity in ink or coating compositions.
4) The polymer of the presently claimed invention, when used as a dispersant, allows water-based processability of ink or coating compositions, thus improving their compliance with environmental and safety norms.
5) The polymer of the presently claimed invention is compatible with commonly used ink or coating ingredients and, therefore, has no unwanted negative interaction with said ingredients.

In the following, there is provided a list of embodiments to further illustrate the present disclosure without intending to limit the disclosure to the specific embodiments listed below.

1. A polymer which is obtained by reacting i) at least one polyacrylate P1 which is obtained by controlled free radical polymerization of a mixture M1 comprising at least one acrylate monomer selected from the group consisting of $C_1$-$C_6$ alkyl esters of acrylic acid, $C_1$-$C_6$ alkyl esters of methacrylic acid, hydroxy $C_1$-$C_6$ alkyl esters of acrylic acid and hydroxy $C_1$-$C_6$ alkyl esters of methacrylic acid in the presence of either a1 or a2, wherein a1 is at least one nitroxylether of formula $R^{21}R^{22}NOX$ (I) and a2 is at least one stable free nitroxyl radical of formula $R^{21}R^{22}NO\cdot$ (II);

$R^{21}$ and $R^{22}$ are independently selected from substituted or unsubstituted, linear or branched $C_5$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of $-CH_2$-phenyl, $-CH_3CH$-phenyl, $-(CH_3)_2C$-phenyl, $-(C_5$-$C_6$ cycloalkyl$)_2C-CN$, $-(CH_3)_2CCN$, $-CH_2CH{=}CH_2$, $-CH_3CH-CH{=}CH_2$, $-(C_1$-$C_4$alkyl$)CR_{20}-C(O)$-phenyl, $-(C_1$-$C_4)$alkyl-$CR_{20}-C(O)-(C_1$-$C_4)$alkoxy, $-(C_1$-$C_4)$alkyl-$CR_{20}-C(O)-(C_1$-$C_4)$alkyl, $-(C_1$-$C_4)$alkyl-$CR_{20}-C(O)-N$-di$(C_1$-$C_4)$alkyl, $-(C_1$-$C_4)$alkyl-$CR_{20}-C(O)-NH(C_1$-$C_4)$alkyl, and $-(C_1$-$C_4)$alkyl-$CR_{20}-C(O)-NH_2$, wherein $R_{20}$ is hydrogen or $(C_1$-$C_4)$alkyl, with ii) a mixture M2 comprising at least one alcohol W selected from the group consisting of W1 and W2 and at least one amine Z selected from the group consisting of Z1 and Z2;

wherein,

W1 is $R^1-OH$, wherein $R^1$ is a substituted or unsubstituted, linear or branched $C_8$-$C_{36}$ alkyl;

W2 is at least one polyether alcohol of formula $B-(O-A)_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, and substituted or unsubstituted $C_1$-$C_{24}$ dialkylaryl and n is an integer in the range of ≥1 to ≤150;

Z1 is $NH_2-R^{11}-NR^{12}R^{13}$, and Z2 is $NH_2-R^{11}-Y$, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen; and Y is a 5- or 6-membered N-containing heterocycle which comprises 1 or 2 nitrogen atoms and 0 or 1 oxygen atom.

2. The polymer according to embodiment 1, wherein the at least one acrylate monomer is selected from the group consisting of n-butylacrylate, methyl acrylate, ethyl acrylate, n-butyl(meth)acrylate, methyl(meth) acrylate, ethyl(meth)acrylate, and 4-hydroxybutylacrylate.

3. The polymer according to any of the embodiments 1 or 2, wherein the at least one nitroxylether of formula $R^{21}R^{22}NOX$ is a compound of formula (Ia), Formula Ia

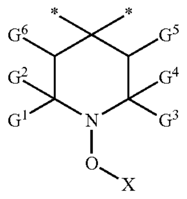

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl;

X is selected from the group consisting of —$CH_2$-phenyl, —$CH_3$CH-phenyl, —$(CH_3)_2$C-phenyl, —($C_5$-$C_6$ cycloalkyl)$_2$C—CN, —$(CH_3)_2$CCN, —$CH_2CH{=}CH_2$, —$CH_3CH$—$CH{=}CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$)alkyl, and —($C_1$-$C_4$)alkyl-$CR_{20}$—C(O)—$NH_2$, wherein $R_{20}$ is hydrogen or ($C_1$-$C_4$) alkyl, wherein phenyl, alkyl, alkoxy and cycloalkyl is in each case unsubstituted or substituted, and alkyl and alkoxy is in each case linear or branched, and

* denotes a valence.

4. The polymer according to any of the embodiments 1 or 2, wherein the at least one stable free nitroxyl radical of formula $R^{21}R^{22}NO\cdot$ is a structural element of formula (IIa), Formula IIa

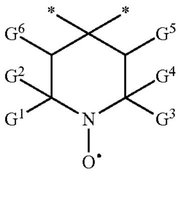

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl; and

* denotes a valence.

5. The polymer according to any of the embodiments 1 to 4, wherein the at least one nitroxylether is Formula Ib

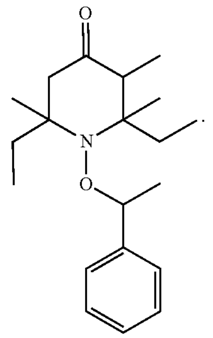

6. The polymer according to any of the embodiments 1 to 5, wherein the polyacrylate P1 is further reacted with at least one ethylenically unsaturated monomer to obtain a polyacrylate P2, which is then reacted with the mixture M2 in step ii).

7. The polymer according to embodiments 6, wherein the polyacrylate P2 is a gradient block copolymer.

8. The polymer according to any of the embodiments 1 to 5, wherein the mixture M1 further comprises at least one ethylenically unsaturated monomer to obtain a polyacrylate P1, which is then reacted with the mixture M2 in step ii).

9. The polymer according to embodiments 8, wherein the polyacrylate P1 is a random copolymer.

10. The polymer according to any of the embodiments 6 to 9, wherein the at least one ethylenically unsaturated monomer is selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds.

11. The polymer according to any of the embodiments 6 to 10, wherein at least one ethylenically unsaturated monomer does not comprise any primary or secondary ester bond.

12. The polymer according to any of the embodiments 6 to 11, wherein the at least one ethylenically unsaturated monomer is selected from the group consisting of isoprene, 1,3-butadiene, α-$C_5$-$C_{18}$-alkene, 4-vinyl-pyridine or pyridinium-ion, 2-vinyl-pyridine or pyridinium-ion, vinyl-imidazole or imidazolinium ion, dimethylacrylamide, 3-dimethylaminopropylmethacrylamide, styrene, α-methyl styrene, p-methyl styrene, p-tert-butyl-styrene and a compound of formula $CH_2{=}C(R_a)$—(C═Z)—$R_b$, wherein $R_a$ is hydrogen or methyl, $R_b$ is $NH_2$, O-(Me+), unsubstituted $C_1$-$C_{18}$-alkoxy, $C_2$-$C_{100}$-alkoxy interrupted by at least one nitrogen and/or oxygen atom, or hydroxy-substituted $C_1$-$C_{15}$ alkoxy, unsubstituted $C_1$-$C_{18}$ alkylamino, di($C_1$-$C_{18}$ alkyl)-amino, hydroxy-substituted $C_1$-$C_{18}$ alkylamino or hydroxy-substituted di($C_1$-$C_{18}$ alkyl) amino, —O—$CH_2$—$CH_2$—$N(CH_3)_2$ or —O—$CH_2$—$CH_2$—$N^+H(CH_3)_2An^-$; $A_n$– is an anion of a monovalent organic or inorganic acid;

Me is a monovalent metal atom or the ammonium ion; and

Z is oxygen or sulfur.

13. The polymer composition according to any of the embodiments 6 to 12, wherein the at least one ethylenically unsaturated monomer is selected from the group consisting of 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene and p-tert.-butyl-styrene.

14. The polymer according to any of the embodiments 1 to 13, wherein $R^1$ is a substituted or unsubstituted, linear or branched $C_{10}$-$C_{34}$ alkyl.

15. The polymer according to any of the embodiments 1 to 14, wherein the compound $R^1$—OH is selected from the group consisting of nonan-1-ol, nonan-2-ol, dodecan-1-ol, decan ol, and decan-2-ol.

16. The polymer according to any of the embodiments 1 to 13, wherein A is ethylene or propylene and B is selected from the group consisting of substituted or unsubstituted, linear or branched $C_1$-$C_4$ alkyl and n is an integer in the range of ≥1 to ≤50.

17. The polymer according to any of the embodiments 1 to 13, wherein the at least one polyether alcohol of formula B—(O-A)$_n$-OH is methoxypolyethylene glycol having a number average molecular weight ($M_n$) in the range of ≥100 to ≤1000 g/mol, as determined according to DIN 55672-1.

18. The polymer according to embodiment 17, wherein the at least one polyether alcohol of formula B—(O-A)$_n$-OH is methoxypolyethylene glycol having a number average molecular weight ($M_n$) in the range of ≥200 to ≤800 g/mol, as determined according to DIN 55672-1.

19. The polymer according to any of the embodiments 1 to 18, wherein $R^{11}$ is unsubstituted, linear or branched $C_1$-$C_8$ alkylene.

20. The polymer according to any of the embodiments 1 to 19, wherein $R^{11}$ is selected from the group consisting of —$CH_2$—, —$CH_2CH_2$—, —$CH_2CH_2CH_2$— and —$CH_2CH_2CH_2CH_2$—.

21. The polymer according to any of the embodiments 1 to 20, wherein $R^{12}$ and $R^{13}$ are unsubstituted, linear or branched $C_1$-$C_8$ alkyl together with the nitrogen atom to which they are attached form an unsubstituted or substituted 3- to 6-membered ring comprising 1 or 2 heteroatom(s) selected from nitrogen and oxygen.

22. The polymer according to any of the embodiments 1 to 21, wherein $R^{12}$ and $R^{13}$ are independently selected from the group consisting of methyl, ethyl, propyl and isopropyl.

23. The polymer according to any of the embodiments 1 to 22, wherein $R^{11}$ is unsubstituted, linear $C_1$-$C_8$ alkylene, and $R^{12}$ and $R^{13}$ are independently selected from the group consisting of methyl, ethyl, propyl and isopropyl or $R^{12}$ and $R^{13}$ together with the nitrogen atom to which they are attached form pyrrolidinyl, piperidinyl or morpholinyl.

24. The polymer according to any of the embodiments 1 to 23, wherein Y is selected from the group consisting of imidazolyl and pyridinyl.

25. The polymer according to any of the embodiments 1 to 24, which has an amine number in the range of from about ≥10 to ≤200 mg KOH/g, as determined according to DIN 53176:2002-11.

26. The polymer according to any of the embodiments 1 to 25, wherein the at least one alcohol W to the at least one amine Z weight ratio is in the range of from about 0.1:1 to 10:1.

27. A controlled free radical polymerization process for preparing the polymer according to embodiments 1 to 26 comprising at least the following steps:

a. polymerizing a mixture M1 comprising at least one acrylate monomer in the presence of either a1 or a2;

wherein a1 is at least one nitroxylether of formula $R^{21}R^{22}NOX$ (I) and a2 is at least one stable free nitroxyl radical of formula $R^{21}R^{22}NO\cdot$ (II), wherein $R^{21}$ and $R^{22}$ are independently selected from substituted or unsubstituted, linear or branched $C_5$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —($C_5$-$C_6$ cycloalkyl)$_2$C—CN, —$(CH_3)_2CCN$, —$CH_2CH$=$CH_2$, —$CH_3CH$—$CH$=$CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$)alkyl, and —($C_1$-$C_4$)alkyl-$CR_{20}$—C(O)—$NH_2$, wherein $R_{20}$ is hydrogen or ($C_1$-$C_4$)alkyl; and b. modifying the polyacrylate obtained in step a. by transesterification using at least one alcohol (W) selected from the group consisting of W1 and W2, and transamidization using at least one amine (Z) selected from the group consisting of Z1 and Z2;

wherein W1 is $R^1$—OH, wherein $R^1$ is a substituted or unsubstituted, linear or branched $C_8$-$C_{36}$ alkyl;

W2 is at least one polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, or substituted and unsubstituted $C_1$-$C_{24}$ dialkylaryl and n is an integer in the range of ≥1 to ≤150;

Z1 is $NH_2$—$R^{11}$—$NR^{12}R^{13}$, and Z2 is $NH_2$—$R^{11}$—Y, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen; and Y is a 5- or 6-membered N-containing heterocycle which comprises 1 or 2 nitrogen atoms and 0 or 1 oxygen atom.

28. The process according to embodiment 27, wherein the at least one nitroxylether of formula $R^{21}R^{22}NOX$ is a compound of formula (Ia), Formula Ia

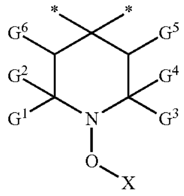

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl;

X is selected from the group consisting of —$CH_2$-phenyl, —$CH_3$CH-phenyl, —$(CH_3)_2$C-phenyl, —($C_5$-$C_6$ cycloalkyl)$_2$C—CN, —$(CH_3)_2$CCN, —$CH_2CH$═$CH_2$, —$CH_3$CH—CH═$CH_2$, —($C_1$-$C_4$alkyl)$CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$)alkyl and —($C_1$-$C_4$)alkyl-$CR_{20}$—C(O)—$NH_2$, wherein $R_{20}$ is hydrogen or ($C_1$-$C_4$) alkyl, wherein phenyl, alkyl, alkoxy and cycloalkyl is in each case unsubstituted or substituted, and alkyl and alkoxy is in each case linear or branched, and

* denotes a valence.

29. The process according to embodiment 27, wherein the at least one stable free nitroxyl radical of formula $R^{21}R^{22}NO\cdot$ is a structural element of formula (IIa), Formula IIa

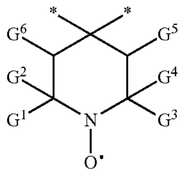

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl; and

* denotes a valence.

30. The process according to any of the embodiments 27 to 29, wherein the at least one nitroxylether of formula $R^{21}R^{22}NOX$ is Formula Ib

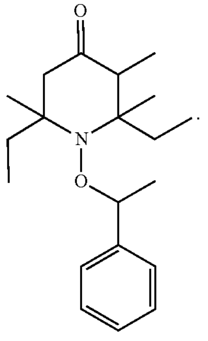

31. The process according to any of the embodiments 27 to 30, wherein the polyacrylate P1 of step a. is further reacted with at least one ethylenically unsaturated monomer, which is then modified in step b.

32. The process according to any of the embodiments 27 to 30, wherein the mixture M1 of step a. further comprises at least one ethylenically unsaturated monomer, which is then modified in step b.

33. The process according to embodiments 31 or 32, wherein the at least one ethylenically unsaturated monomer is selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds.

34. The process according to any one of the embodiments 31 to 33, wherein at least one ethylenically unsaturated monomer does not comprise any primary or secondary ester bond.

35. The process according to any of the embodiments 31 to 34, wherein the at least one ethylenically unsaturated monomer is selected from the group consisting of isoprene, 1,3-butadiene, α-$C_5$-$C_{18}$-alkene, 4-vinyl-pyridine or pyridinium-ion, 2-vinyl-pyridine or pyridinium-ion, vinyl-imidazole or imidazolinium ion, dimethylacrylamide, 3-dimethylaminopropylmethacrylamide, styrene, α-methyl styrene, p-methyl styrene, p-tert-butyl-styrene and a compound of formula $CH_2$═C($R_a$)—(C═Z)—$R_b$, wherein $R_a$ is hydrogen or methyl, $R_b$ is $NH_2$, O-(Me+), unsubstituted $C_1$-$C_{18}$-alkoxy, $C_2$-$C_{100}$-alkoxy interrupted by at least one nitrogen and/or oxygen atom, or hydroxy-substituted $C_1$-$C_{15}$ alkoxy, unsubstituted $C_1$-C18 alkylamino, di($C_1$-$C_{18}$ alkyl)-amino, hydroxy-substituted $C_1$-$C_{18}$ alkylamino or hydroxy-substituted di($C_1$-$C_{18}$ alkyl) amino, —O—$CH_2$—$CH_2$—$N(CH_3)_2$ and —O—$CH_2$—$CH_2$—$N^+H(CH_3)_2An^-$;

$A_n$– is an anion of a monovalent organic or inorganic acid;

Me is a monovalent metal atom or the ammonium ion; and

Z is oxygen or sulfur.

36. The process according to any of the embodiments 27 to 35, wherein $R^1$ is a substituted or unsubstituted, linear or branched $C_{10}$-$C_{34}$ alkyl.

37. The process according to any of the embodiments 27 to 36, wherein the compound WON is selected from the group consisting of nonan-1-ol, nonan-2-ol, dodecan-1-ol, decan-1-ol, and decan-2-ol.

38. The process according to any of the embodiments 27 to 37, wherein A is ethylene or propylene and B is selected from the group consisting of substituted or unsubstituted, linear or branched $C_1$-$C_4$ alkyl and n is an integer in the range of ≥1 to ≤50.

39. The process according to any of the embodiments 27 to 38, wherein heating the mixture M1 of step a. is carried out at a temperature in the range of from about 70-200° C.
40. The process according to any of the embodiments 27 to 39, wherein the at least one acrylate monomer to a1 or a2 mol ratio is in the range of from about 1:1 to 70:1.
41. The process according to any of the embodiments 27 to 38, wherein the at least one alcohol W to the at least one amine Z weight ratio is in the range of from about 0.1:1 to 10:1.
42. A coating composition comprising the polymer according to embodiments 1 to 26.
43. An ink composition comprising the polymer according to embodiments 1 to 26.
44. The ink or coating composition according to the embodiments 42 or 43, further comprising a particulate solid material selected from the group consisting of pigments, fillers, liquid diluent, and combinations thereof.
45. The ink or coating composition according to any of the embodiments 42 to 44, wherein the ink or coating composition has a viscosity in the range of from about ≥200 to ≤4000 mPa·s, as determined according to DIN 53019-1:2008-09.
46. The ink or coating composition according to any of the embodiments 42 to 45, wherein the ink or coating composition has a jetness in the range of from ≥150 to ≤500, as determined according to DIN 55979.
47. The ink or coating composition according to any of the embodiments 42 to 46, wherein the polymer has a weight percentage in the range of from about 1 to 10%, based on the ink or coating composition.
48. The ink or coating composition according to any of the embodiments 42 to 47, wherein the polymer to the pigment weight ratio is in the range of from about 0.1:1 to 1.5:1.
49. Use of the polymer according to any of the embodiments 1 to 26 as a dispersant in coating composition or an ink or coating composition.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.

Materials

All chemicals employed herein, were obtained commercially—Sigma Aldrich, USA. For the purposes of the presently claimed invention, the commercial grade purity of chemicals was found to be sufficient. However, as may be anticipated, further purification of ingredients would be expected to yield improvement in plasticizer performance.

Methods

Amine number: The amine number was determined according to DIN 53176:2002-11.

The number average molecular weight (Mn) was determined by means of gel permeation chromatography (GPC) in tetrahydrofuran against polystyrene standards.

The polydispersity index was determined by means of gel permeation chromatography (GPC).

OH value was determined according to ASTM E222-17.

Viscosity: The viscosity was determined by analogy to DIN 53019-1:2008-09, using a Thermo-Haake RheoStress 600 equipment under the CR mode at 22° C. and a shear rate of 1 $sec^{-1}$ (Spindle CP50).

Gloss: The gloss of the obtained coatings at 20° angle was determined according to DIN 67530/DIN EN ISO 2813: 2012-10 using a commercial reflectometer (Micro-Tri-Gloss reflectometer from BYK Gardner).

Jetness was measured according to DIN 55979.

Preparation of Polyacrylate (P1) by Controlled Free Radical Polymerization—

P1: Synthesis of a Linear Polybutylacrylate (BA)

The polyacrylate was prepared by controlled free radical polymerization of a mixture M1 comprising an acrylate. In a 3-necked 1000 ml round bottom flask, fitted with a magnetic stirring bar, a cooler, a thermometer and a dropping funnel, 150.10 g n-butylacrylate (n-BA, acrylate monomer, 128.17 g/mol), 8.55 g compound of formula 1b (nitroxylether; 317.48 g/mol) and 122.13 g of methoxypropylacetate (MPA; solvent) were added, and the system was degassed three times with $N_2$/vacuum. Following which, polymerization was carried out at 135° C. under $N_2$ until a conversion of around 8 mol % is reached. 338.89 g of n-BA was slowly added to the reaction with the dropping funnel and the polymerization was continued at 135° C. under $N_2$ until a conversion of around 48 mol %. Residual monomers and solvents were distilled off at 80° C. and 12 mbar.

Analysis—Yield 47% (liquid). Further, analysis was carried out using gel permeation chromatography or GPC (tetrahydrofuran or THF, polystyrene or PS-Standard). The results are as follows—$M_n$=7800 g/mol and polydispersity or PD=1.27. According to analysis via $^1$H-NMR, the degree of polymerization was 75.

Polyacrylate P2: Synthesis of a Linear Block Copolymer Poly(n-BA-b-4VP)

The polyacrylate P1 may be further reacted with an ethylenically unsaturated monomer such as 4-vinylpyridine, before it is reacted with the mixture M2. In a 3-necked 500 ml round bottom flask, fitted with a magnetic stirring bar, a cooler, and a thermometer, 214.18 g of P1, 70.90 g 4-vinylpyridine (4-VP, ethylenically unsaturated monomer, 105.14 g/mol) and 79.70 g of MPA were added and the system was degassed three times with $N_2$/vacuum and polymerized at 125° C. under $N_2$ for 8 h. Residual monomers and solvents are distilled off at 80° C. and 12 mbar.

Yield 85% (liquid). Further, analysis was carried out using GPC (THF, PS-Standard). The results are as follows—$M_n$=8600 g/mol, PD=1.24. According to analysis via 1H-NMR, the degree of polymerization was: P(BA-b-4VP) =75-b-14. The said product, i.e., P2 was used as an intermediate for further modification via transesterification and transamidization.

Modification of Polyacrylate (P2) by Transesterification and Transamidization

Further to the synthesis above, the polyacrylates were modified in presence of an alcohol and amine (mixture M2). The table 1 below lists the polymers along with their constituent amines and polyacrylates—

TABLE 1

| Polymer (example No.) | Polyacrylate | Amine | Alcohol* | Amine number |
|---|---|---|---|---|
| 1 | P2<br>45 g | 3-(dimethylamino)-1-propylamine<br>2.5 g | MPEG-OH<br>50 g | 45 mg<br>KOH/g |
| 2 | P2<br>45 g | 3-(dimethylamino)-1-propylamine<br>5 g | MPEG-OH<br>50 g | 56 mg<br>KOH/g |
| 3 | P2<br>45 g | 1-(3-Aminopropyl)imidazole<br>6 g | MPEG-OH<br>50 g | 58 mg<br>KOH/g |
| 4 | P2<br>45 g | 4-(Aminomethyl) pyridine<br>6 g | MPEG-OH<br>50 g | 60 mg<br>KOH/g |
| 5 | P2<br>45 g | N-(2-aminoethyl)-piperidine<br>6 g | MPEG-OH<br>50 g | 58 mg<br>KOH/g |
| 6 | P2<br>45 g | 3-Morpholinopropylamine<br>6 g | MPEG-OH<br>50 g | 54 mg<br>KOH/g |

*MPEG-OH- methoxy-poly-ethyleneglycol.

Details of synthesis as per constitutions mentioned in table 1 above have been mentioned below—

Polymer Synthesis

Example 1

A mixture of 45 g polyacrylate P2, 2.5 g 3-(dimethylamino)-1-propylamine and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 45 mg KOH/g was obtained. GPC indicated almost quantitative conversion of the MPEG-OH.

Example 2

A mixture of 45 g polyacrylate P2, 5 g 3-(dimethylamino)-1-propylamine and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 56 mg KOH/g was obtained. GPC indicated almost quantitative conversion of the MPEG-OH.

Example 3

A mixture of 45 g polyacrylate P2, 6 g 1-(3-aminopropyl) imidazole and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 58 mg KOH/g was obtained. GPC indicated almost quantitative conversion of the MPEG-OH.

Example 4

A mixture of 45 g polyacrylate P2, 6 g 4-(aminomethyl) pyridine and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 60 mg KOH/g was obtained. GPC indicated almost quantitative conversion of the MPEG-OH.

Example 5

A mixture of 45 g polyacrylate P2, 6 g N-(2-aminoethyl)-piperidine and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 58 mg KOH/g was obtained. GPC indicated almost quantitative conversion of the MPEG-OH.

Example 6

A mixture of 45 g polyacrylate P2, 6 g 3-morpholinopropylamine and 50 g MPEG-OH ($M_n$=500 g/mol) was dried at 120° C. under $N_2$ gas for 3 hours. Then, three portions of 0.1 g lithium-t-butoxide was added during 12 hours at 130° C. Then, the mixture was heated up to 150° C. to remove the formed n-butanol during 12 hours under vacuum. Finally, a yellowish viscous dispersant with an amine number of 54 mg KOH/g was obtained. GPC indicated almost quantitative conversion of the MPEG-OH.

Comparative Example (CP1): Without Transamidization

Transesterification Only—with MPEG-OH

In a 500 mL flask equipped with a magnetic stirring bar, distillation column with dry ice acetone cooling, was charged with 92.8 g of P2 in 107.2 g of xylene and 114.7 g of MPEG-OH ($M_n$=550 g/mol). Subsequently, the system was dried by azeotropic distillation of the xylene. Three portions of 0.36 g of tera(isopropyl)orthotitanate was added over 3 hours at 190-205° C. Thus, formed n-butanol was distilled off under reduced pressure.

Yield—187.7 g of Poly(n-BA-MPEGA-b-4-VP) was obtained. Further, analysis yielded $M_n$=17500 g/mol, PDI=1.6, OH-value=0.05 meq/g. GPC indicated almost quantitative conversion of the MPEG-OH.

Thus, the obtained comparative polymer—Poly(n-BA-MPEGA-b-4-VP) or CP1 was directly used as dispersant without any further treatment with amine (i.e., no transamidization was carried out).

Performance Testing:

In order to establish the applicability of the polymer as a dispersant, the above-mentioned polymers were tested. In this regard, resin free pigment concentrates (millbase) were prepared according to the formulation 1 mentioned below—Formulation 1:—Preparation of Pigment Concentrates/Millbase

| | | |
|---|---|---|
| 1) | Polymer (100% solid) | 13.5 g |
| 2) | MPA solvent | 61.5 g |
| 3) | Butylglycol | 10 |
| 4) | Pigment: Carbon Black FW 200 | 15 g |
| 5) | 2.0 mm glass beads | 100 g |
| | Total | 200 g |

The millbase was dispersed in Scandex Shaker for 4 hours with the help of glass beads. Afterwards the millbase was filtered and stored at room temperature overnight. Furthermore, a paint was prepared by mix of 2.0 g millbase (as mentioned above) into 8.0 g let-down system (formulation 2) via Dispermat for 2 min at 2000 rpm. The tinted formulation is applied at hiding on a glass substrate and after curing jetness are measured from the backside (through glass). The jetness and viscosity of the formulations is enlisted in Table 2 below.

TABLE 2

| Millbase viscosity (Viscosity @ 1 $S^{-1}$) and Jetness | | |
|---|---|---|
| Dispersant | Viscosity* | Jetness** |
| Comparative polymer (CP1) | 16500 | 308 |
| Polymer of example 2 | 2550 | 310 |
| Polymer of example 3 | 500 | 308 |
| Polymer of example 4 | 9500 | 312 |

*viscosity in mPa · s

**jetness was measured according to DIN 55979.

It was observed that the performance of the dispersants was generally very good with low millbase viscosity (refer table 2 above). Further, it was noted that the inventive polymers did not in any way interfere with the native performance (refer jetness values in table 2 above) of the dye/ink pigments, in spite of initiating a remarkable reduction in viscosity.

The invention claimed is:

1. A controlled free radical polymerization process for preparing the a polymer comprising the steps of:

a. polymerizing a mixture M1 comprising at least one acrylate monomer comprising n-butyl acrylate in the presence of either a1 or a2;

wherein a1 is at least one nitroxylether of formula $R^{21}R^{22}NOX$ (I) and a2 is at least one stable free nitroxyl radical of formula $R^{21}R^{22}NO\cdot$ (II); wherein $R^{21}$ and $R^{22}$ are independently selected from substituted or unsubstituted, linear or branched $C_5$-$C_{18}$ alkyl, wherein $R^{21}$ and $R^{22}$ together with the nitrogen atom to which they are attached form an unsubstituted or substituted 5- to 10-membered aliphatic ring comprising 1 to 3 heteroatom(s) selected from nitrogen and oxygen, and X is selected from the group consisting of —$CH_2$-phenyl, —$CH_3CH$-phenyl, —$(CH_3)_2C$-phenyl, —($C_5$-$C_6$ cycloalkyl)$_2C$—CN, —$(CH_3)_2CCN$, —$CH_2CH{=}CH_2$, —$CH_3CH$—$CH{=}CH_2$, —($C_1$-$C_4$alkyl) $CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$)alkyl-$CR_{20}$—C(O)—NH($C_1$-$C_4$) alkyl, and —($C_1$-$C_4$)alkyl-$CR_{20}$—C(O)—$NH_2$, wherein $R_{20}$ is hydrogen or ($C_1$-$C_4$)alkyl; and b. modifying the polyacrylate obtained in step a. by transesterification using at least one alcohol (W) selected from the group consisting of W1 and W2, and transamidization using at least one amine (Z) selected from the group consisting of Z1 and Z2;

wherein W1 is $R^1$—OH, wherein $R^1$ is a substituted or unsubstituted, linear or branched $C_8$-$C_{36}$ alkyl;

W2 is at least one polyether alcohol of formula B—(O-A)$_n$-OH, wherein A is a substituted or unsubstituted, linear or branched $C_1$-$C_4$ alkylene and B is selected from the group consisting of substituted or unsubstituted, linear or branched $C_1$-$C_{22}$ alkyl, substituted or unsubstituted $C_1$-$C_{24}$ alkylaryl, and substituted or unsubstituted $C_1$-$C_{24}$ dialkylaryl and n is an integer in the range of ≥1 to ≤150;

Z1 is $NH_2$—$R^{11}$—$NR^{12}R^{13}$, and Z2 is $NH_2$—$R^{11}$—Y, wherein $R^{11}$ is a substituted or unsubstituted, linear or branched $C_1$-$C_{12}$ alkylene;

$R^{12}$ and $R^{13}$ are independently selected from the group consisting of hydrogen and substituted or unsubstituted, linear or branched $C_1$-$C_{12}$ alkyl, or $R^{12}$ and $R^{13}$ together with the nitrogen atom to which they are attached form an unsubstituted or substituted 3- to 12-membered ring comprising 1 to 3 heteroatom(s) selected from nitrogen and oxygen;

and

Y is a 5- or 6-membered N-containing heterocycle which comprises 1 or 2 nitrogen atoms and 0 or 1 oxygen atom, wherein the polyacrylate P1 of step a, is further reacted with at least one ethylenically unsaturated monomer, which is then modified in step b, and wherein a weight ratio of the at least one alcohol W to the at least one amine Z is in the range of from 0.1:1 to 10:1.

2. The method according to claim 1, wherein the at least one ethylenically unsaturated monomer is selected from the group consisting of a $C_5$-$C_{20}$ vinylaromatic, an ethylenically unsaturated nitrile, acrylamide, a vinyl halide, a vinyl ether of an $C_1$-$C_{10}$ alcohol and an $C_2$-$C_8$ aliphatic hydrocarbon having one or two double bonds.

3. The method according to claim 1, wherein the at least one ethylenically unsaturated monomer is selected from the group consisting of 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene and p-tert.-butyl-styrene.

4. The method according to claim 1, wherein $R^1$ is a substituted or unsubstituted, linear or branched $C_{10}$-$C_{34}$ alkyl.

5. The method according to claim 1, wherein the compound $R^1$—OH is selected from the group consisting of nonan-1-ol, nonan-2-ol, dodecan-1-ol, decan-1-ol, and decan-2-ol.

6. The method according to claim 1, wherein A is ethylene or propylene and B is selected from the group consisting of substituted or unsubstituted, linear or branched $C_1$-$C_4$ alkyl and n is an integer in the range of ≥1 to ≤50.

7. The method according to claim 1, wherein the at least one polyether alcohol of formula B—(O-A)$_n$-OH is methoxypolyethylene glycol having a number average molecular weight ($M_n$) in the range of ≥100 to ≤1000 g/mol, as determined according to DIN 55672-1.

8. The method according to claim 1, wherein $R^{11}$ is unsubstituted, linear or branched $C_1$-$C_8$ alkylene.

9. The method according to claim 1, wherein and $R^{12}$ and $R^{13}$ are unsubstituted, linear or branched $C_1$-$C_8$ alkyl or $R^{12}$ and $R^{13}$ together with the nitrogen atom to which they are attached form an unsubstituted or substituted 3- to 6-membered ring comprising 1 or 2 heteroatom(s) selected from nitrogen and oxygen.

10. The method according to claim 1, wherein Y is selected from the group consisting of imidazolyl and pyridinyl.

11. The process according to claim 1, wherein the at least one nitroxylether of formula $R^{21}R^{22}NOX$ is a compound of formula (Ia), Formula Ia

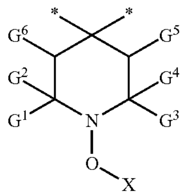

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl;

X is selected from the group consisting of —$CH_2$-phenyl, —$CH_3$CH-phenyl, —$(CH_3)_2$C-phenyl, —($C_5$-$C_6$ cycloalkyl)$_2$C—CN, —$(CH_3)_2$CCN, —$CH_2CH{=}CH_2$, —$CH_3$CH—$CH{=}CH_2$, —($C_1$-$C_4$alkyl) $CR_{20}$—C(O)-phenyl, —($C_1$-$C_4$)alkyl-$CR_{20}$—C(O)—($C_1$-$C_4$)alkoxy, —($C_1$-$C_4$)alkyl-$CR_{20}$—C(O)—($C_1$-$C_4$)alkyl, —($C_1$-$C_4$)alkyl-$CR_{20}$—C(O)—N-di($C_1$-$C_4$)alkyl, —($C_1$-$C_4$) alkyl-$CR_{20}$—C(O)—NH($C_1$-$C_4$)alkyl, —($C_1$-$C_4$)alkyl-$CR_{20}$—C(O)—$NH_2$, wherein $R_{20}$ is hydrogen or ($C_1$-$C_4$)alkyl, wherein phenyl, alkyl, alkoxy and cycloalkyl is in each case unsubstituted or substituted, and alkyl and alkoxy is in each case linear or branched, and

* denotes a valence.

12. The process according to claim 1, wherein the at least one stable free nitroxyl radical of formula $R^{21}R^{22}NO\cdot$ is a structural element of formula (IIa), Formula IIa

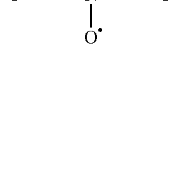

wherein, $G^1$, $G^2$, $G^3$, $G^4$ are independently unsubstituted or unsubstituted, linear or branched $C_1$-$C_6$ alkyl or $G^1$ and $G^2$ or $G^3$ and $G^4$, or $G^1$ and $G^2$ and $G^3$ and $G^4$ together form an unsubstituted or unsubstituted $C_5$-$C_{12}$ cycloalkyl group;

$G^5$, $G^6$ independently are selected from the group consisting of hydrogen, unsubstituted or unsubstituted, linear or branched $C_1$-$C_{18}$ alkyl, unsubstituted or unsubstituted phenyl, unsubstituted or unsubstituted naphthyl and —C(O)—O—$C_1$-$C_{18}$ alkyl; and

* denotes a valence.

13. The process according to claim 1, wherein the at least one ethylenically unsaturated monomer does not comprise any primary or secondary ester bond.

14. The process according to claim 1, wherein the at least one ethylenically unsaturated monomer is selected from the group consisting of isoprene, 1,3-butadiene, α-$C_5$-$C_{18}$-alkene, 4-vinyl-pyridine or pyridinium-ion, 2-vinyl-pyridine or pyridinium-ion, vinyl-imidazole or imidazolinium ion, dimethylacrylamide, 3-dimethylaminopropylmethacrylamide, styrene, α-methyl styrene, p-methyl styrene, p-tert-butyl-styrene and a compound of formula $CH_2{=}C(R_a)$—(C═Z)—$R_b$, wherein $R_a$ is hydrogen or methyl, $R_b$ is $NH_2$, O-(Me+), unsubstituted $C_1$-$C_{18}$-alkoxy, $C_2$-$C_{100}$-alkoxy interrupted by at least one nitrogen and/or oxygen atom, or hydroxy-substituted $C_1$-$C_{18}$ alkoxy, unsubstituted $C_1$-$C_{18}$ alkylamino, di($C_1$-$C_{18}$ alkyl)-amino, hydroxy-substituted $C_1$-$C_{18}$ alkylamino or hydroxy-substituted di($C_1$-$C_{18}$ alkyl)amino, —O—$CH_2$—$CH_2$—$N(CH_3)_2$ and —O—$CH_2$—$CH_2$—$N^+H(CH_3)_2A_n^-$;

$A_n$- is an anion of a monovalent organic or inorganic acid;

Me is a monovalent metal atom or the ammonium ion; and

Z is oxygen or sulfur.

15. The process according to claim 1, wherein the process further comprises heating the mixture M1 of step a. carried out at a temperature in the range of from about 70-200° C.

16. The method according to claim 1, wherein the weight ratio of the at least one alcohol W to the at least one amine Z is in the range of from 1:1 to 5:1.

17. A method comprising providing a polymer prepared by the process of claim 1 and adding the polymer as a dispersant in coating composition or an ink composition.

18. The method according to claim 17, wherein the coating composition has a viscosity in the range of from about ≥200 to ≤4000 mPa·s, determined according to DIN 53019-1:2008-09.

19. The method of claim 18, wherein the coating composition has a jetness in the range of from 250 to 400, as determined according to DIN 55979.

20. The method according to claim 17, wherein the ink composition has a viscosity in the range of from about ≥200 to ≤4000 mPa·s, determined according to DIN 53019-1: 2008-09.

21. The method of claim 20, wherein the ink composition has a jetness in the range of from 300 to 400, as determined according to DIN 55979.

22. The method of claim 20, wherein the ink composition has a jetness in the range of from 250 to 400, as determined according to DIN 55979.

* * * * *